(12) United States Patent
Jacobs et al.

(10) Patent No.: US 6,225,995 B1
(45) Date of Patent: May 1, 2001

(54) METHOD AND APPARATUS FOR INCORPORATING STATE INFORMATION INTO A URL

(75) Inventors: Lawrence Jacobs, Redwood Shores; Seshu Adunuthula, Foster City; Mala Anand, Palo Alto, all of CA (US)

(73) Assignee: Oracle Corporaton, Redwood Shores, CA (US)

( * ) Notice: Subject to any disclaimer, the term of this patent is extended or adjusted under 35 U.S.C. 154(b) by 0 days.

(21) Appl. No.: 08/962,028

(22) Filed: Oct. 31, 1997

(51) Int. Cl.[7] .................................................... G06F 13/00
(52) U.S. Cl. ........................ 345/335; 709/229; 713/202
(58) Field of Search ..................................... 345/335, 334, 345/336, 357, 329, 331; 709/206, 229, 203; 713/202

(56) References Cited

U.S. PATENT DOCUMENTS

| 5,361,350 | 11/1994 | Conner et al. ........................ 395/600 |
| 5,457,797 | 10/1995 | Butterworth et al. ............... 395/682 |
| 5,546,584 | 8/1996 | Lundin et al. ........................ 395/700 |

(List continued on next page.)

FOREIGN PATENT DOCUMENTS

| 0 733 969 A1 | 9/1996 | (EP) . |
| 0812088A2 | 12/1997 | (EP) . |
| WO97/40457 | 10/1997 | (WO) .............................. G06F/17/30 |

OTHER PUBLICATIONS

Evans, E., et al., Using Java applets and CORBA for multi–user distributed applications, IEEE Internet Computing, vol. 1, No. 3, May, 1997, pp. 43–55.

Edwards, N., et al., "High security Web servers and gateways," Computer Nteworks and ISDN Systems, vol. 29, No. 8–13, Sep., 1997, pp. 927–938.

Merle, P., et al., "CorbaWeb: A generic object navigator", Computer Networks and ISDN Systems, vol. 28, No. 11, May 1996.

Gray, J., et al: "Scale Up with TP Monitors," 4465 BYTE, vol. 20, No. 4, Apr., 1995.

Szmurlo, Maurice, et al., "A Network of Asynchronous Micro–Servers as a Framework for Server Development," Computer Networks and ISDN Systems, vol. 29, No. 8–13, Sep. 1997.

Web Page containing an article written by Rich Levin titled "NetDynamics To Launch Web Database Development System Upgrade," Sep. 29, 1997, (As printed on Dec. 11, 1997).

KIVA Software Corporation, "Development and Managing Web–based Enterprise Applications".

(List continued on next page.)

Primary Examiner—Raymond J. Bayerl
Assistant Examiner—Tadesse Hailu
(74) Attorney, Agent, or Firm—HIckman Palermo Truong & Becker, LLP; Carl L. Brandt

(57) ABSTRACT

The present invention provides an effective and highly scalable mechanism for supporting multiple-request operations (including but not limited to transactions) in a stateless environment, such as the web. A server is used to coordinate the overall processing of client requests. The server performs this coordination function in such a way that: (1) state information associated with multiple-request operations is maintained by the clients making the requests; (2) the clients are unaware that they are maintaining operation-specific state information; and (3) the server itself is not required to persistently maintain the state information, thereby remaining stateless.

39 Claims, 16 Drawing Sheets

U.S. PATENT DOCUMENTS

| | | | |
|---|---|---|---|
| 5,613,148 | 3/1997 | Bezviner et al. | 395/800 |
| 5,623,656 | 4/1997 | Lyons | 707/10 |
| 5,706,442 | 1/1998 | Anderson et al. | 395/227 |
| 5,708,780 | 1/1998 | Levergood et al. | |
| 5,715,314 | 2/1998 | Payne et al. | |
| 5,724,424 | 3/1998 | Gifford | |
| 5,737,592 | 4/1998 | Nguyen et al. | 395/604 |
| 5,737,607 | 4/1998 | Hamilton et al. | 395/701 |
| 5,745,681 | 4/1998 | Levine et al. | 709/200 |
| 5,761,662 | 6/1998 | Dasan | 707/10 |
| 5,761,673 | 6/1998 | Bookman et al. | 707/104 |
| 5,761,684 | 6/1998 | Gibson | 707/515 |
| 5,774,670 | 6/1998 | Montulli | 395/200.57 |
| 5,796,393 | 8/1998 | MacNaughton et al. | 345/329 |
| 5,822,585 | 10/1998 | Noble et al. | 345/680 |
| 5,826,239 | 10/1998 | Du et al. | 705/8 |
| 5,826,242 | 10/1998 | Montulli | 705/27 |
| 5,835,712 | 11/1998 | DuFresne | 709/203 |
| 5,848,246 * | 12/1998 | Gish | 395/200.58 |
| 5,857,191 | 1/1999 | Blackwell et al. | 707/10 |
| 5,859,971 | 1/1999 | Bittinger et al. | 709/203 |
| 5,859,972 | 1/1999 | Subramaniam et al. | 395/200.33 |
| 5,860,072 | 1/1999 | Schofield | 707/101 |
| 5,862,318 | 1/1999 | Habben | 395/182.18 |
| 5,862,325 | 1/1999 | Reed et al. | 395/200.31 |
| 5,864,866 | 1/1999 | Henckel et al. | 707/103 |
| 5,864,871 | 1/1999 | Kitain et al. | 707/104 |
| 5,872,969 * | 2/1999 | Copeland et al. | 395/671 |
| 5,875,296 * | 2/1999 | Shi et al. | 395/188.01 |
| 5,890,161 | 3/1999 | Helland et al. | 707/103 |
| 5,897,622 * | 4/1999 | Blinn et al. | 705/26 |
| 5,909,492 * | 6/1999 | Payne et al. | 380/24 |
| 5,961,601 * | 10/1999 | Iyengar | 709/229 |
| 5,991,802 * | 11/1999 | Allard et al. | 709/219 |

OTHER PUBLICATIONS

Luotonen et al., "World–Wide Web proxies", pp. 147–154, computer Network and ISDN system, Jan. 1994.

James Powell, "Creating a hypertext library information system,"pp. 59–66, Feb. 1994.

Progrewss Software, "Webspeed 1.0 technical product brief" 1998, wysiwyg://90/http://www/progress–softwa. . .ernet/webspeed/white/tech/docs/arch.html.

Computer Reseller News "Progress Software offers tools to speed use of Web", Oct. 7, 1996, http://proquest.umi.com/pqdweb?TS=91798. . .&Sid=1&Deli=1&RQT=309&Dtp=1.

Butler Group Technology Audits, "Butler Group WebSpeed Technology Audit" 1996, http://www.realtime.co.za/webspeed/whitep/wp03.html.

Netscape "Persistent Client State HTTP Cookies" 19997, http://home.netscape.com/newsref/std/cookiespec.html.

M/Gateway Developments Ltd. "Persistence and State Awareness in WebLink" 1996, http://www.intersys.com/products/whitepapes/weblinkstate.html.

* cited by examiner

|  | 402 | 404 | 406 | 400 |
|---|---|---|---|---|
|  | INSTANCE | CARTRIDGE | STATUS |  |
| 408 → | 1 | C1 | BUSY |  |
| 410 → | 3 | C1 | FREE |  |
|  | 7 | C1 | BUSY |  |
|  | 1 | C2 | BUSY |  |
|  | 5 | C2 | FREE |  |
| 412 → | 3 | C3 | BUSY |  |

FIG. 4

| INSTANCE | CARTRIDGE | LISTENER | MACHINE |
|---|---|---|---|
| 1 | C1 | L210 | M1 |
| 3 | C1 | L210 | M2 |
| 7 | C1 | L210 | M3 |
| 1 | C2 | L210 | M1 |
| 5 | C2 | L210 | M1 |
| 3 | C3 | L210 | M3 |
| 2 | C1 | L216 | M1 |
| 4 | C1 | L216 | M2 |
| 5 | C1 | L216 | M3 |
| 3 | C2 | L216 | M1 |
| 4 | C2 | L216 | M1 |
| 1 | C3 | L216 | M3 |
| 2 | C2 | UNOWNED | M1 |
| 2 | C3 | UNOWNED | M2 |

FIG. 5

METHOD AND APPARATUS FOR INCORPORATING STATE INFORMATION INTO A URL

FIELD OF THE INVENTION

This invention relates to processing transactions in networked computer systems, and more specifically to processing multiple-request transactions in a stateless web environment.

BACKGROUND OF THE INVENTION

The World Wide Web includes a network of servers on the Internet, each of which is associated with one or more HTML (Hypertext Markup Language) pages. The HTML pages associated with a server provide information and hypertext links to other documents on that and (usually) other servers. Servers communicate with clients by using the Hypertext Transfer Protocol (HTTP). The servers listen for requests from clients for their HTML pages, and are therefore often referred to as "listeners".

Users of the World Wide Web use a client program, referred to as a browser, to request, decode and display information from listeners. When the user of a browser selects a link on an HTML page, the browser that is displaying the page sends a request over the Internet to the listener associated with the Universal Resource Locator (URL) specified in the link. In response to the request, the listener transmits the requested information to the browser that issued the request. The browser receives the information, presents the received information to the user, and awaits the next user request.

Traditionally, the information stored on listeners is in the form of static HTML pages. Static HTML pages are created and stored at the listener prior to a request from a web browser. In response to a request, a static HTML page is merely read from storage and transmitted to the requesting browser. Currently, there is a trend to develop listeners that respond to browser requests by performing dynamic operations. For example, a listener may respond to a request by issuing a query to a database, dynamically constructing a web page containing the results of the query, and transmitting the dynamically constructed HTML page to the requesting browser. To perform dynamic operations, the functionality of the listener must be enhanced or augmented. Various approaches have been developed for extending listeners to support dynamic operations.

One of the major characteristics of the web is that it provides a stateless environment. That is, HTTP communicates information on a message-by-message basis without any mechanism for designating relationships between messages. This means that a process servicing a current request cannot determine whether the current request came from the same client as a previous request. In addition, the servicing process cannot determine how or if the current request relates to a previous request.

A disadvantage with using a stateless environment is that it is difficult to process multiple-request transactions. A multiple-request transaction is a set of operations that (1) are specified in more than one request, and (2) must be performed as an atomic unit of work. For example, a multiple-request transaction could consist of three separate operations, such as buying stock item A, selling stock item B and updating the inventory to reflect the number of stock items on hand. Each of these three operations may be specified in a separate request, but each operation should only be performed if all three operations can be performed.

In order to properly determine that buying stock item A, selling stock item B and updating the inventory are from the same single transaction requires that transaction state information be retained by the servicing process that receives the three requests.

One possible solution to the stateless problem is to spawn a servicing process for each request-issuing source (each "client"). Each time a request from a client is received, the same servicing process is called upon to process the request. Because the same process is invoked for a given client, the transaction state information for a particular transaction can be maintained by the associated servicing process, thus allowing for the processing of multiple-request transactions.

This solution has significant drawbacks, however. First, maintaining a separate servicing process for each client is wasteful since most clients do not continually make requests to the servicing process. Between client requests, the servicing process simply waits, consuming system resources, without performing any work. A second drawback with this solution is that it is non-scalable. If a servicing process is spawned and maintained for each client, system resources would quickly be consumed, even for a relatively small number of clients. Therefore, spawning a servicing process for each client is not a viable solution for large scale systems.

A second possible solution is to require each servicing process to maintain the current state of the transactions that it is currently processing. By maintaining transaction state information, each servicing process can ensure that multiple-request transactions are processed correctly. However, a drawback associated with requiring each servicing process to maintain transaction state information is that puts a burden on the developer of each servicing process to write extra code in order to maintain the required transaction state information H.

Based on the foregoing, it is desirable to provide a mechanism for processing multiple-request transactions in a stateless environment that does not require a servicing process to maintain transaction state information.

SUMMARY OF THE INVENTION

The present invention provides an effective and highly scalable mechanism for supporting multiple-request operations (including but not limited to transactions) in a stateless environment, such as the web. According to the invention, a server is preferably used to coordinate the overall processing of client requests. Preferably, the server performs this coordination function in such a way that: (1) state information associated with multiple-request operations is maintained by the clients making the requests; (2) the clients are unaware that they are maintaining operation-specific state information; and (3) the server itself is not required to persistently maintain the state information, thereby remaining stateless.

In a preferred embodiment, processing of a client request is performed as follows. The server receives a request from a client, and if the request is for a multiple-request operation, the server initiates an operation. Once the operation is initiated, the server may either forward the request to another entity (such as an application) for processing, or the server may process the request itself. After the request is processed, the server assembles a set of state information associated with the operation. This state information may include the identity of the client, the ID and status of the operation, what has already transpired in the operation, and any other context information associated with the operation. Once assembled, the state information is incorporated into a URL. This URL, along with the response to the client request, is sent back to the client to be maintained by the client. This state information is preferably not persistently maintained by the server.

When the client submits a second request relating to the same operation, the client sends the URL that was previously provided by the server which contains the state information. Upon receiving the second request, the server extracts the state information from the URL, and uses it to resume the previously initiated operation. With the benefit of this state information, the server can resume the operation at the exact point at which the previous request stopped. Once the operation is resumed, the server either processes the request, or forwards it to another entity for processing. After the second request is processed, the server updates the state information associated with the operation, and incorporates the updated state information into another URL. This URL, along with the response to the second request, is sent back to the client to be maintained by the client. The client will send this URL in a future request to resume the operation. This process repeats until the operation is either completed or canceled.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a block diagram of a table containing information maintained by a dispatcher according to an embodiment of the invention;

FIG. 5 is a block diagram of a table containing information maintained by a resource manager according to an embodiment of the invention.

DETAILED DESCRIPTION OF THE PREFERRED EMBODIMENT

A method and apparatus for processing multiple-request transactions over a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
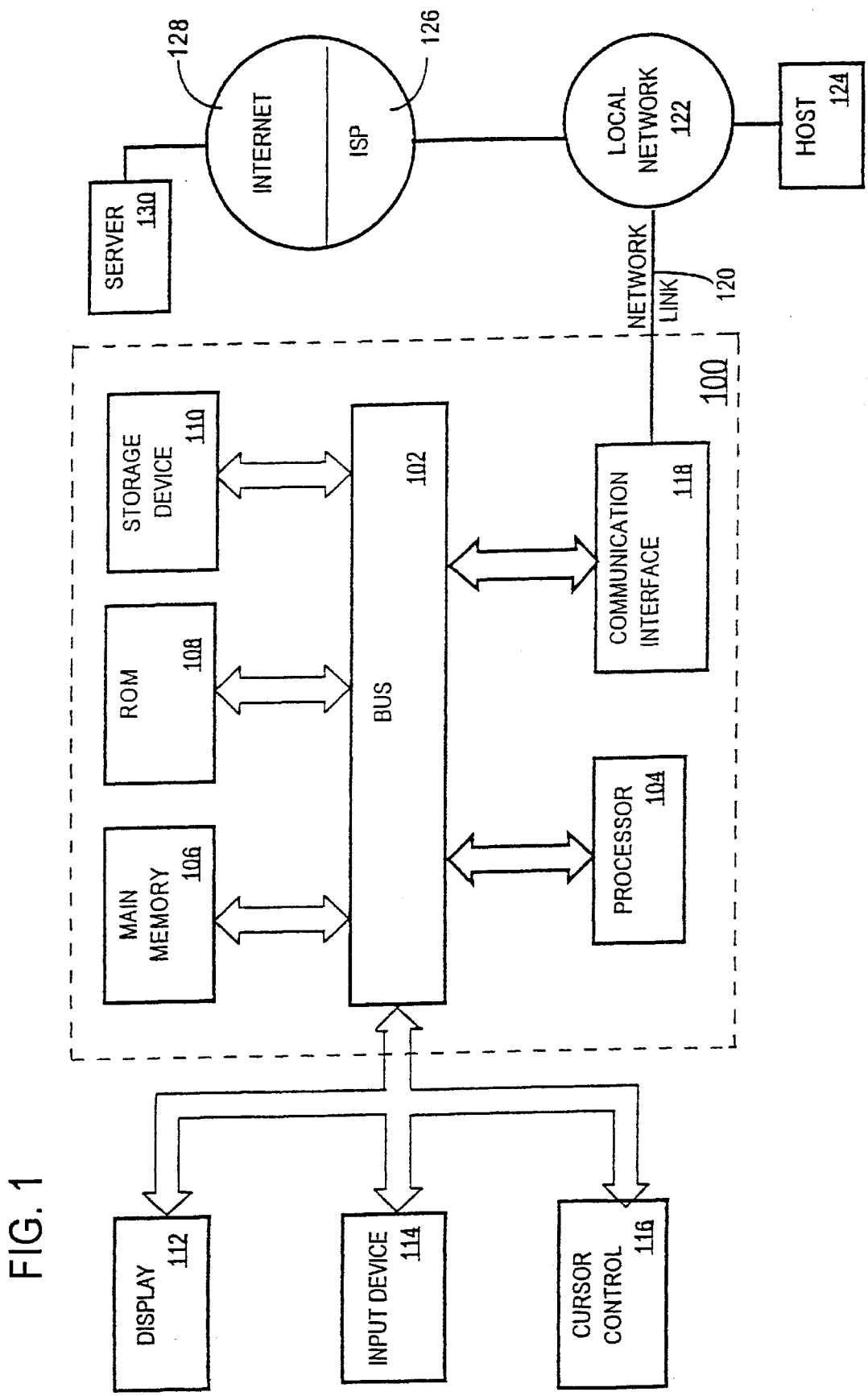
FIG. 1 is a block diagram of a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 to perform specific operations in response to messages from browsers. According to one embodiment of the invention, the operations are performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

FUNCTIONAL OVERVIEW OF APPLICATION SERVER

Figure 2:
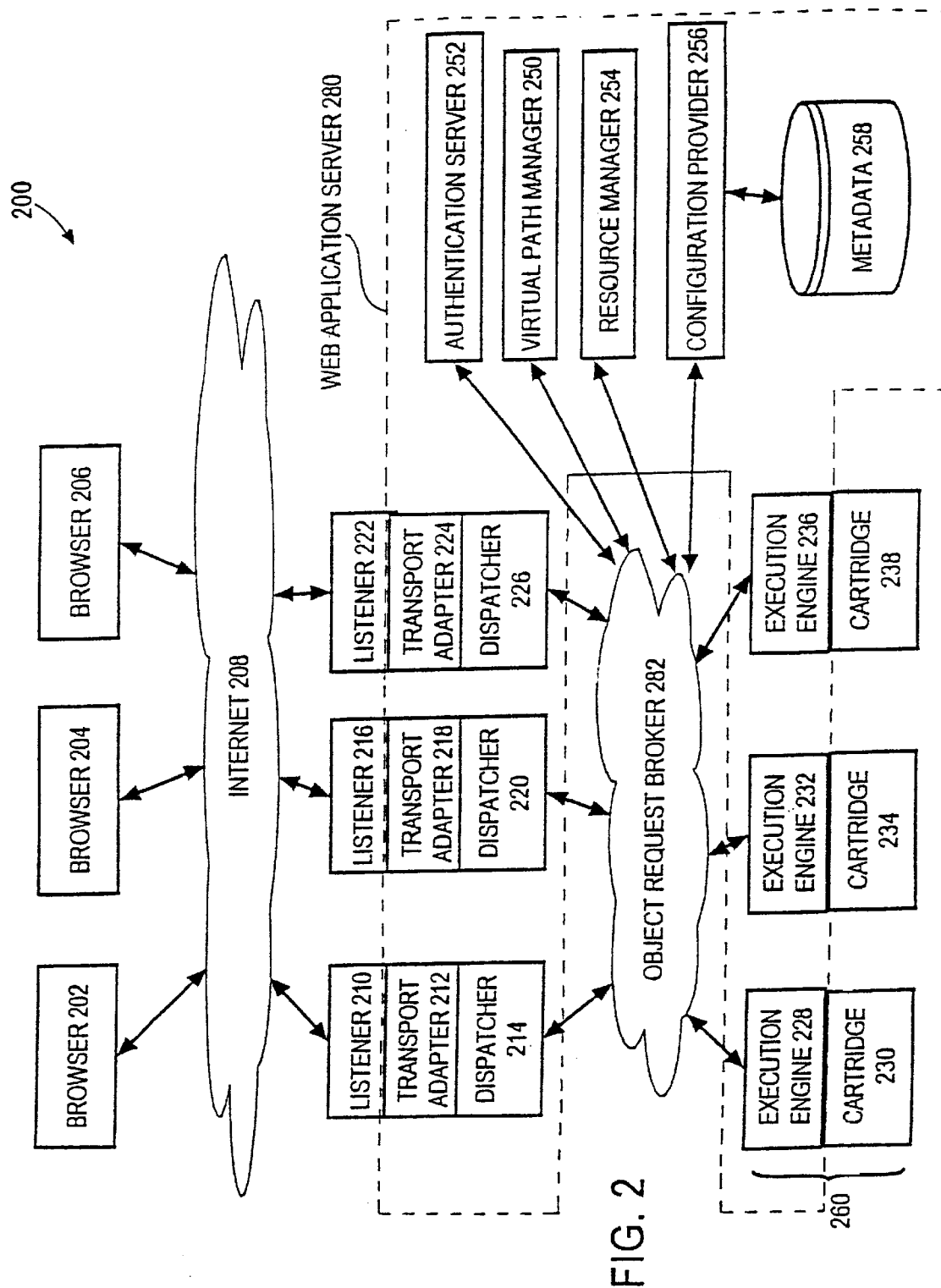
FIG. 2 is a block diagram of a distributed application server according to an embodiment of the invention.

FIG. 2 is a block diagram of a system 200 designed according to an embodiment of the invention. The system 200 includes a plurality of browsers 202, 204 and 206 that communicate with a plurality of listeners 210, 216 and 222 over the Internet 208 according to the HTTP protocol. In response to requests from the browsers, the listeners cause a web application server 280 to invoke software modules, referred to herein as cartridges. In the illustrated embodiment, web application server 280 has initiated the execution of three cartridges 230, 234 and 238.

The web application server 280 is composed of numerous components, including transport adapters 212, 218 and 224, dispatchers 214, 220 and 226, an authentication server 252, a virtual path manager 250, a resource manager 254, a configuration provider 256 and a plurality of cartridge execution engines 228, 232 and 236. The various components of the web application server 280 shall be described hereafter in greater detail.

Significantly, the numerous components of web application server 280 communicate through an inter-machine communication mechanism, such as an Object Request Broker 282. Using an inter-machine communication mechanism, cartridge instances that perform the operations specified in browser requests may execute on different machines than the listeners that receive the requests and the browsers that issue the requests. Because the cartridge instances are on different machines than the listeners, the listeners are better insulated against faulty cartridge instances, thus enhancing the reliability and security of the system. In addition, the scalability of the system is greatly increased by spreading the processing burden of executing the cartridge instances among many machines, rather than the same machine that is executing the listener. The ability to distribute cartridge instance execution across multiple machines allows numerous types of load balancing techniques to be used in deciding when and where to spawn new cartridge instances.

A typical operation within system 200 generally includes the following stages:

A browser transmits a request over the Internet 208.

A listener receives the request and passes it through a transport adapter to a dispatcher.

The dispatcher communicates with virtual path manager 250 to identify a cartridge selected by the browser request and to determine whether the cartridge requires authentication If the cartridge requires authentication, the dispatcher communicates with the authentication server 252 to determine whether the browser is authorized to access the selected cartridge.

If the authentication server 252 determines that the browser is not authorized to access the selected cartridge, the browser is notified that access has been denied.

However, if access is authorized or the virtual path manager 250 determines that authentication is not required, the dispatcher does one of two things. If the dispatcher knows about an unused instance for that cartridge, the dispatcher sends the request to that instance. If there are no unused cartridge instances for that cartridge, the dispatcher asks the resource manager 254 to create a new cartridge instance. After the instance starts up successfully, the cartridge notifies the resource manager of its existence. The resource manager 254 then notifies the dispatcher of the new instance. The dispatcher creates a revised request based on the browser request and sends the revised request to the new instance.

The cartridge instance handles the revised request and sends a response to the dispatcher.

The dispatcher passes the response back through the listener to the client.

These stages shall be described in greater detail hereafter.

CARTRIDGES

Cartridges are modules of code for performing specific application or system functions. A cartridge forms the basic unit of distribution in the system 200. According to one embodiment of the invention, cartridges are named using Universal Resource Locators (URLs). Thus, a cartridge name (i.e. URL) has two parts: the IP address of the server on which the cartridge resides, and the virtual path in the server directory structure of the compiled cartridge code. Because cartridges are named using URLs, the cartridge name space is global and cartridges may be accessed using the same messaging techniques as are used to access other web resources, such as documents.

According to one embodiment of the invention, each cartridge has a standard interface which provides a common overall structure for all cartridges. The standard interface defines the interface of routines that are invoked by the web application server 280 under particular conditions. According to one embodiment of the invention, the abstract cartridge interface is as follows:

```
interface Cartridge
{
boolean init();
boolean authenticate(in Principal user_passwd);
boolean exec(in Request req_obj, out Response resp_obj);
boolean shutdown();
}
```

The init( ) routine is responsible for intializing the cartridge instance. This may include invoking the constructors of several subobjects, preforking threads and acquiring all other required shared resources.

The shutdown( ) routine is responsible for cleaning up all of the resources and shutting down the cartridge instance. Once the shutdown( ) routine is invoked on a cartridge instance, it immediately becomes unavailable for servicing subsequent requests.

The authenticate( ) routine validates whether the client requesting the services of the cartridge is authorized to use those services.

The exec( ) routine is the generic way to dispatch all service requests to the cartridge.

EXEMPLARY CARTRIDGES

Each cartridge is either configured as a cartridge that performs a well-defined function, or as a programmable cartridge that acts as an interpreter or a routine environment for an application. An example of a programmable cartridge is a PL/SQL runtime, configured to process database queries according to the Oracle-based Programming Language using Structured Query Language (PL/SQL). The PL/SQL runtime executes a browser request having a database query. The PL/SQL runtime processes the request, for example, by accessing a database server in communication with the cartridge instance via a data link.

Another example of a programmable cartridge is a JAVA runtime interpreter. The JAVA runtime interpreter cartridge enables web application developers to write server-side JAVA applications to process browser requests. Similarly, a custom server may be configured as a cartridge in order to provide dynamic operations such as, for example, accessing processes executed by a third party server.

DISPATCHERS

Dispatchers are software modules configured to route the requests received by listeners to the appropriate cartridges. According to one embodiment of the invention, dispatchers are implemented as server-side program extensions (i.e. "plug-ins"). As such, the dispatchers are loaded into and execute within the same address space as the listeners to which they belong. The dispatchers may be linked with the listener code at compile time or dynamically loaded at runtime.

In the illustrated embodiment, dispatchers 214, 220 and 226 are associated with listeners 210, 216 and 222, respectively. Dispatchers 214, 220 and 226 selectively route browser requests received by listeners 210, 216 and 222 to cartridges.

For example, assume that listener 210 receives a browser request over the Internet 208 delivered in the form of a Uniform Resource Locator (URL). The browser request serves as an identifier for a web object, for example an HTML page or an operation to be performed. The listener 210 hands off the browser request to dispatcher 214 without any attempt at interpreting the browser request. Upon receiving the browser request, the dispatcher 214:

(1) communicates with virtual path manager 250 to identify a cartridge selected by the browser request and to determine whether the cartridge requires authentication, (2) if the cartridge requires authentication, communicates with the authentication server 252 to determine whether the browser is allowed to access the selected cartridge, (3) if access is authorized, communicates with the resource manager to determine the specific instance of the selected cartridge to which the browser request should be sent, and (4) creates and dispatches a revised browser request for execution by the specified instance of the cartridge.

The revised browser request repackages information received in the original browser request. The revised browser request may include, for example, a context object that contains data required for the proper operation of the cartridge. The data required for proper operation of a cartridge may include, for example, a transaction ID that identifies a transaction with which the browser request is associated.

If the cartridge replies to the request, the cartridge sends the reply to the dispatcher and the dispatcher passes the reply up to the listener for transmission to the browser that initiated the request.

CONFIGURATION PROVIDER

According to one embodiment of the invention, cartridges that are to be used with web application server 280 are first registered with web application server 280. During the registration process, information about the cartridges is supplied to the configuration provider 256. Configuration provider 256 stores the information as metadata 258 for later access by the components of the web application server 280.

The metadata 258 may include, for example, (1) the cartridge name;

(2) the minimum number of required instances;

(3) the maximum number of instances;

(4) the location of the code that implements the cartridge;

(5) the program-dependent function names used by the cartridge execution engine to execute the callback functions (initialization, request handler, shutdown);

(6) a list of machines for running the cartridge;

(7) the idle time for the cartridge (the amount of time instances of the cartridge are allowed to remain idle before they are shut down);

(8) an object identifier; and (9) data indicating the type of authentication service, if any, to be used with the cartridge.

The object identifier specifies the data that must be supplied by a browser request for requesting performance of an operation by the corresponding cartridge. The object type may be a specific word, a URL, or may include a virtual path such as "/java".

Once the configuration provider 256 has stored the configuration information for a particular cartridge in the metadata 258, that cartridge is automatically registered when web application server 280 is started.

After a cartridge is registered with the web application server 280, the resource manager 254 initiates the minimum instances for the cartridge. Once the minimum number of instances has been initiated, the web application server 280 is prepared to process browser requests.

THE VIRTUAL PATH MANAGER

As mentioned above, dispatchers communicate with the virtual path manager 250 to determine where to route each revised browser request. Specifically, each browser request typically includes a URL. Upon receiving a browser request, the dispatcher sends the URL in the request to the virtual path manager 250. The virtual path manager 250 responds by sending the dispatcher data that identifies the cartridge, if any, associated with the URL.

In order to supply the required information to dispatchers, virtual path manager 250 consults the metadata 258 that maps URLs to cartridges. In response to receiving a browser request, the virtual path manager 250 uses the mapping data to determine the cartridge, if any, to which the URL contained in the browser requests corresponds.

For example, if the browser request is a URL request beginning with the virtual path "/java", the mapping may indicate that the JAVA interpreter cartridge is configured to handle requests having the virtual path "/java".

According to one embodiment of the invention, the virtual path manager 250 also determines whether the cartridge associated with the URL requires authentication. If the cartridge requires authentication, the virtual path manager 250 indicates in the response that the virtual path manager 250 sends to the dispatcher that authentication is required. If authentication is not required, the dispatcher creates and sends a revised browser request to an instance of the cartridge without invoking the authentication server 252. If authentication is required, the dispatcher sends the revised request to an instance of the cartridge only after the authentication server indicates that the revised request may be submitted to an instance of the cartridge.

THE RESOURCE MANAGER

The resource manager 254 of the web application server 280 manages the execution of each of the cartridges by initiating a predetermined minimum number of instances for the cartridges, load balancing between the instances of each cartridge, and initiating new instances of cartridges as necessary up to a predetermined maximum number of instances of a given cartridge.

For example, assume that the metadata for a particular cartridge (C1) includes the following information:

Name=C1

Minimum Instances=10

Maximum Instances=50

Host Machines=M1, M2, M3

Idle time=30 seconds

Based on this metadata, when cartridge C1 is first registered, resource manager 254 will initiate ten instances of C1. Resource manager 254 will initiate the ten instances on the machines associated with the labels M1, M2 and M3.

Upon receipt of requests from dispatchers to access C1, resource manager 254 determines whether any existing instance of C1 is available for use. If no instance of C1 is available when a request is received, resource manager 254 determines whether the maximum number of instances of C1 are already running. If the maximum number of instances of C1 are not already running, then resource manager 254 initiates a new instance of C1 on one of the possible host machines and transmits a message that identifies the new instance to the dispatcher that issued the request. If the maximum number of instances of C1 are already running, then resource manager 254 sends a message to the dispatcher that issued the request to indicate that the request cannot be handled at this time.

LOAD BALANCING

According to one embodiment of the invention, resource manager 254 applies a set of load balancing rules to determine where to initiate instances of cartridges where there is more than one possible host machine. Thus, in the above example, M1, M2 and M3 are all capable of executing instances of cartridge C1. If M1, M2 and M3 have the same processing capacity, it may be desirable to distribute the instances evenly across the three machines. However, if M1 has ten times the processing power of M2 and M3, it may be desirable to initiate all instances of C1 on M1 up to a certain point, and then to distribute additional instances evenly among M1, M2 and M3.

To assist resource manager 254 in determining how to load balance among possible machines, the metadata stored for each cartridge may include additional details. For example, the metadata may specify a separate minimum and maximum number of instances for each machine. Resource manager 254 may then distribute new instances among the machines based on which machine has the lowest ratio of actual instances to maximum instances.

The metadata may also specify an order for the machines that can run a cartridge. The machine at the N+1 position in the order is only used to execute instances of the cartridge when the machine at the Nth position in the order is already executing its maximum number of instances.

CARTRIDGE INSTANCE STATUS TRACKING

According to one embodiment of the invention, the resource manager 254 maintains state information to keep track of cartridge instances that have been created. The state information includes data that identifies the instance, identifies the machine executing the instance, and identifies the listener to which the instance has been assigned.

FIG. 5 illustrates a table 500 that may be maintained by resource manager 254 to store this state information. Table 500 includes an instance column 502, a cartridge column 504, a listener column 506 and a machine column 508. Each row of table 500 corresponds to a distinct cartridge instance. Within the row for a given cartridge instance, cartridge column 504 identifies the cartridge associated with the cartridge instance and instance column 502 indicates the instance number of the cartridge instance. For example, row 510 corresponds to an instance of cartridge C1. Therefore, cartridge column 504 of row 510 indicates cartridge C1. Instance column 502 of row 510 indicates that the cartridge instance associated with row 510 is instance 1 of cartridge C1.

Listener column 506 indicates the listener to which the cartridge instance associated with a row has been assigned. Machine column 508 indicates the machine on which the cartridge instance associated with a row is executing. For example, the cartridge instance associated with row 510 has been assigned to listener 210 and is executing on machine M1.

Similar to resource manager 254, each dispatcher maintains state information for the cartridge instances that have been assigned to the listener to which the dispatcher is attached. Such state information may be maintained, for example, in a table 400 as shown in FIG. 4. Similar to table 500, table 400 includes an instance column 402 and a cartridge column 404 that respectively hold instance numbers and cartridge identifiers. However, while table 500 includes one entry for every cartridge instance assigned by resource manager 254, table 400 only includes entries for cartridge instances that have been assigned to a particular listener. For example, table 400 includes entries for only those cartridge instances listed in table 500 that have been assigned to listener 210.

In addition to instance column 402 and cartridge column 404, table 400 includes a status column 406. For each row, the status column 406 holds a value that indicates the status of the instance associated with the row. For example, the status column 406 of row 408 indicates that instance 1 of cartridge C1 is currently busy. In the illustrated embodiment, the status column 406 holds a flag that indicates that a cartridge instance is either BUSY or FREE. The significance of the cartridge status shall now be describe with reference to the operation of resource manager 254 and dispatchers 214 and 220.

INTERACTION BETWEEN DISPATCHERS AND THE RESOURCE MANAGER

As explained above, dispatchers communicate with resource manager 254 when they need to send a revised browser request to a particular cartridge. According to one embodiment of the invention, dispatchers first determine whether an instance of the appropriate cartridge (1) has already been assigned to it and (2) is available to process the new revised browser request. If an appropriate cartridge instance has already been assigned to the dispatcher and is currently available to process the new revised browser request, then the dispatcher forwards the revised browser request to the cartridge instance without further communication with resource manager 254.

For example, assume that listener 210 receives a browser request that, according to virtual path manager 250, must be processed by cartridge C1. Assume also that table 400 reflects the current list and status of cartridge instances that have been assigned to listener 210. Upon receiving the browser request from listener 210, dispatcher 214 inspects table 400 to locate a FREE instance of cartridge C1. In the illustrated table 400, row 410 indicates that instance 3 of cartridge C1 is currently FREE. Consequently, dispatcher 214 forwards a revised browser request directly to instance 3 of cartridge C1 without further communication with resource manager 254. In response to sending the revised browser request, dispatcher 214 changes the status value in status column 406 of row 410 to BUSY.

If a listener has not already been assigned an appropriate cartridge instance that is currently available, then the dispatcher associated with the cartridge requests a cartridge instance from the resource manager 254. If the resource manager 254 determines that an instance of the required cartridge is not available and the number of existing instances of the required cartridge is below the maximum, then the resource manager 254 initiates a new cartridge. Upon initiating a new cartridge, the resource manager 254 inserts an entry for the new cartridge instance in table 500.

Assume, for example, that listener 210 receives a browser request that must be processed by cartridge C3. Assume also that instance 3 of cartridge C3 has not yet been initiated. Under these conditions, dispatcher 214 sends to resource manager 254 a request for a handle to an instance of cartridge C3. In response to this request, resource manager 254 initiates instance 3 of cartridge C3 on machine M3. In addition, resource manager 254 inserts into table 500 the entry found at row 512.

After inserting row 512 for instance 3 of cartridge C3 in table 500, resource manager 254 sends back to the dispatcher 214 a handle to the newly created instance. In response to receiving this handle, dispatcher 214 inserts an entry (row 412) for the new instance in its status table 400. The dispatcher 214 then transmits a revised browser request to instance 3 of cartridge C3.

RELEASING CARTRIDGE INSTANCES

According to one embodiment of the invention, listeners do not automatically release ownership of cartridge instances when the cartridge instances finish responding to outstanding browser requests. For example, assume that instance 3 of cartridge C3 receives a revised browser request, processes the revised browser request, and sends a response back to dispatcher 214. Dispatcher 214 passes the response to listener 210 to be sent back to the browser that issued the browser request.

At this point, listener 210 no longer requires ownership of instance 3 of cartridge C3. However, rather than transferring ownership of instance 3 of cartridge C3 back to resource manager 254, dispatcher 214 merely changes the status column 406 of row 412 from BUSY to FREE.

Changing the value in status column 406 of row 412 to FREE indicates that instance 3 of cartridge C3 is no longer working on a request, and is therefore ready to handle subsequent requests. However, because table 400, which indicates that instance 3 of cartridge C3 is available, is maintained locally by dispatcher 214, instance 3 of cartridge C3 is only available for subsequent browser requests arriving at listener 210. Row 512 of table 500 maintained by resource manager 254 continues to indicate that instance 3 of cartridge C3 is owned by listener 210.

Because listeners do not automatically release cartridge instances every time a request is serviced, overhead associated with communication between the resource manager 254 and the various dispatchers is significantly reduced. For example, assume that a listener 210 receives ten successive requests that must be communicated to cartridge C3. Rather than communicating with resource manager 254 for each of the ten requests, dispatcher 214 may communicate with resource manager 254 in response to the first request. The subsequent nine requests can be handled by dispatcher 214 without communicating with resource manager 254 because the dispatcher 214 uses the same instance of C3 that processes the first request to process the nine subsequent requests.

While not automatically releasing listener ownership of cartridge instances when each request is serviced can increase the efficiency of web application server 280, listeners cannot maintain ownership of cartridge instances indefinitely. For example, instances that have not been used for long periods of time should be passed back to the resource manager 254 so they can be de-allocated to free up resources. In addition, it is not efficient for one listener to maintain ownership of the instance of a cartridge that it has not used for a relatively long time when other listeners require instances of that cartridge.

Consequently, resource manager 254 communicates to each listener a maximum idle time for each cartridge instance passed to the listener. The maximum idle time indicates the maximum amount of time a cartridge instance can go unused before the listener must release ownership of the cartridge instance. For example, assume that the resource manager 254 indicates to listener 210 that the maximum amount of idle time for instance 3 of cartridge C3 is 10 minutes. Based on this information, listener 210 may continue to use instance 3 of cartridge C3 to process browser requests for cartridge C3 as long as instance 3 of cartridge C3 does not remain idle or FREE for more than 10 minutes.

If instance 3 of cartridge C3 is idle for more than 10 minutes, dispatcher 214 removes row 412 from table 400 and sends a message to resource manager 254 that listener 210 is releasing ownership of instance 3 of cartridge C3. In response to this message, resource manager 254 updates row 512 to indicate that instance 3 of cartridge C3 is not owned by any listener and may thus be reassigned to another listener or terminated.

In an alternative embodiment, dispatchers do not automatically release cartridge instances when the idle time for the cartridge instance has expired. Instead, the dispatcher sends a message to resource manager 254 offering to release the expired instance. Resource manager 254 may respond to the offer by requesting that the listener release the cartridge instance, or by allowing the listener to retain ownership of the expired cartridge instance.

According to one embodiment of the invention, resource manager 254 maintains a queue of the requests that cannot be immediately serviced. When it becomes possible to service a queued request, the request is removed from the queue and processed.

For example, assume that listener 222 receives a browser request that must be processed by cartridge C1, and that listener 222 has not been assigned any instances of cartridge C1. Dispatcher 226 sends a request for an instance of C1 to resource manager 254. Assume further that a maximum of 50 instances of C1 are allowed, and that 50 instances of C1 have been assigned to listener 210. Under these conditions, resource manager 254 cannot service the request from listener 222. Therefore, resource manager 254 puts the request on a queue. When listener 210 releases an instance of C1, resource manager 254 communicates to listener 222 that an instance of C1 is available.

Under certain conditions, resource manager 254 may preemptively cause a listener to release a cartridge instance. For example, resource manager 254 may detect a system overload situation and respond by terminating a set of cartridge instances, either before or after informing the listeners that currently have been assigned the cartridge instances that the cartridge instances are going to be terminated.

Resource manager 254 may also preemptively cause listeners to release cartridge instances to implement fairness policies between listeners. For example, resource manager 254 may cause a listener that holds the most instances of a given cartridge to release an instance of the cartridge when another listener has waited more than a predetermined threshold of amount of time for an instance of the cartridge. For example, if listener 210 has been assigned 50 instances of cartridge C1 and C1 has a maximum of 50 instances, then resource manager 254 may cause listener 210 to release an instance of C1 ten seconds after receiving a request for an instance of C1 from another listener.

CARTRIDGE EXECUTION ENGINES

According to one embodiment of the invention, each cartridge instance is composed of a cartridge execution engine and a cartridge. A cartridge execution engine is a code module that insulates cartridges from the complexities of the web application server 280 and the inter-module communication mechanism. A cartridge is made available to a cartridge execution engine by storing in a function table pointers to the cartridge functions. According to one embodiment, all cartridges provide the functions specified in the exemplary cartridge interface described above. By having all cartridges support the same interface, a single standard cartridge execution engine can be used with all cartridges.

According to one embodiment of the invention, cartridges are implemented as shared libraries, and cartridge execution engines are executable programs that invoke the routines in the shared libraries using the standard cartridge interface. The cartridge execution engine provides the interface between cartridges and the dispatcher, directs cartridge flow of control, and provides services for cartridges to use.

When the resource manager 254 requires the creation of a new cartridge instance, the resource manager 254 causes a cartridge execution engine to be instantiated. In turn, the instance of the cartridge execution engine thus created causes the appropriate cartridge to be instantiated. The resource manager 254 can cause the cartridge execution engine to be instantiated, for example, by invoking a "cartridge execution engine factory" that resides on the machine on which the cartridge is to be executed. The instance of the cartridge execution engine can cause the cartridge to be instantiated, for example, by making a call to one of the routines in the shared library that constitutes the cartridge.

As shown in FIG. 2, the web application server 280 includes cartridge execution engines 228, 232 and 236 for each of the cartridges 230, 234 and 238. The cartridge execution engines control execution of the instances of the corresponding cartridges by making calls into the cartridges through the standard cartridge interface. By establishing basic callback functions between the cartridge execution engine and a cartridge, any cartridge can be integrated into the web application server 280 by configuring the cartridge to respond to the callback functions, and then registering the cartridge in the configuration provider 256, as described below.

Thus, if the dispatcher 214 determines that the PL/SQL runtime cartridge is the appropriate cartridge to process a request, the dispatcher 214 dispatches the request to a cartridge instance that includes a cartridge execution engine associated with the PL/SQL runtime cartridge. If a new instance needs to be initiated, the resource manager 254 creates a new instance of the PL/SQL runtime cartridge in a separate address space and dispatches the request to the cartridge execution engine 228 of the new instance. The address space used to execute the instance of the program may be within memory of the computer system upon which one or more of the components of web application server 280 is executing, or on another computer system.

In response to a message from a dispatcher, the cartridge execution engine issues a request handler callback function to the cartridge, causing the cartridge to process the request. The cartridge executing the request returns the result to the cartridge execution engine, which forwards the result to the dispatcher. In the event that the web application server 280 detects a fault in the operation, the cartridge execution engine issues a shutdown function of the cartridge.

Hence, the cartridge execution engine provides an application programming interface to the web application server 280 that specifies predetermined operations to be performed. Use of the standard cartridge interface enables programmers of the cartridges to configure each cartridge for high-level integration into the web application server 280 independent of the protocols used by the particular web listener with which the cartridge will be used.

TRANSPORT ADAPTERS

Listeners enable the use of server-side plug-ins by providing a programming interface and protocol for use by such plug-ins. Unfortunately, the programming interfaces and protocols provided by listeners vary from listener to listener. For example, Netscape Server Application Programming Interface (NSAPI), Internet Server Application Programming Interface (ISAPI) and Application Development Interface (ADI) are three examples of distinct programming interfaces currently provided by listeners.

Transport adapters insulate dispatchers from the proprietary protocols and interfaces used by web listeners. Specifically, each transport adapter is configured to recognize the protocols of different listeners, and to convert the browser requests received from the listeners into converted browser requests having a standard dispatcher protocol that is independent from the protocol of the listener. Similarly, transport adapters convert the replies from the dispatcher to the transport protocol of the listeners.

Hence, the transport adapter enables the web application server 280 to be used with listeners from different vendors. Moreover, transport adapters may be configured to accommodate different server architectures and operating systems.

OPERATION OF THE WEB APPLICATION SERVER

Figure 3A:
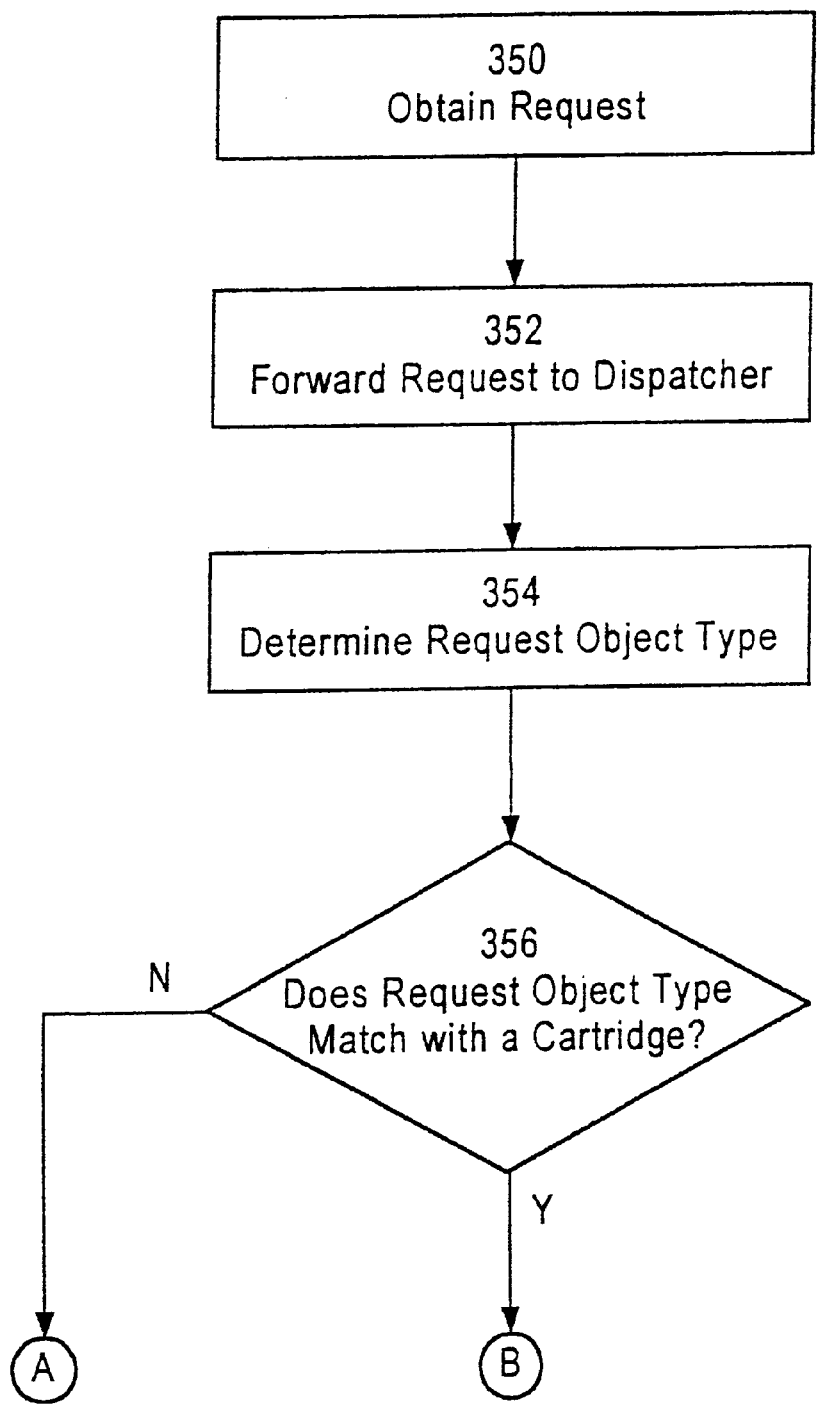
FIG. 3A is a portion of a flow chart illustrating steps for handling a browser request according to an embodiment of the invention.
Figure 3B:
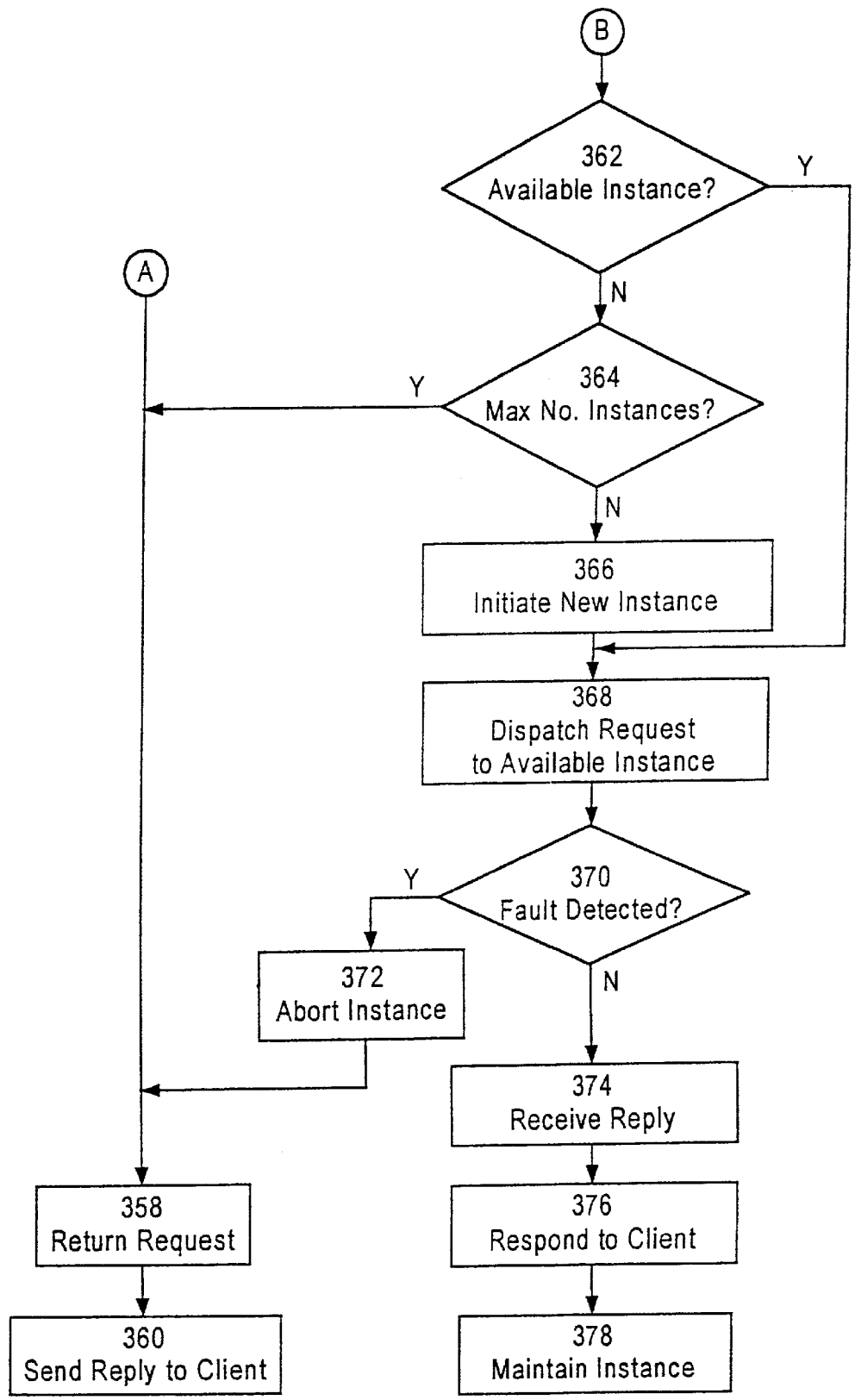
FIG. 3B is another portion of the flow chart illustrating steps for handling a browser request according to an embodiment of the invention.

FIGS. 3A and 3B are a flow diagram illustrating a method of responding to a browser request according to an embodiment of the present invention. The browser request is received in step 350 by a listener. For the purposes of explanation, it shall be assumed that the browser request was issued by browser 202 and received by listener 210.

Upon receiving the browser request, the listener 210 forwards the request to the web application server 280 in step 352. Specifically, listener 210 passes the request to the transport adapter 212 using the proprietary programming interface of the listener 210. The transport adapter 212 converts the request as necessary to pass the request to dispatcher 214 using a standard dispatcher programming interface.

Dispatcher 214 identifies the request object type that corresponds to the browser request in step 354 based on the virtual path specified in the browser request by communicating with the virtual path manager 250. If the request object type corresponds to a cartridge, the virtual path manager also indicates to the dispatcher 214 whether authentication is required.

The dispatcher 214 determines in step 356 if the request object type corresponds to an identifiable cartridge. If the request object type does not correspond to an identifiable cartridge, the request is returned to the listener 210 in step 358 (see FIG. 3B). If in step 358 the listener 210 recognizes the request as a request for a static HTML page, the listener accesses the static HTML page, and sends the HTML page to the browser 202 in step 360. If the browser request is not recognized by the listener 210, the reply is sent to the browser 202 in step 360 indicating that the request was unrecognizable.

If in step 356 the dispatcher 214 determines that the request must be sent to a cartridge, then the dispatcher performs any necessary authentication by communicating with the authentication server 252. The authentication process will be described in greater detail hereafter. In addition, if in step 356 it is determined that listener 210 has not been assigned any instances of that cartridge that are currently FREE, then the dispatcher 214 communicates with the resource manager 254 to be assigned an instance of the cartridge 230 to which the browser request can be sent.

In step 362, shown in FIG. 3B, the resource manager 254 determines whether an instance of the identified cartridge is available (unowned) among the existing number of instances. For the purposes of explanation, it shall be assumed that the request is associated with cartridge 230, and that cartridge 230 is a PL/SQL runtime cartridge.

If in step 362 the resource manager identifies an available instance, for example instance 260 of the PL/SQL runtime 230, the resource manager 254 informs the dispatcher 214 that the request should be sent to instance 260. The dispatcher 214 then creates and sends a revised browser request to the cartridge execution engine 228 of the instance 260 in step 368 to cause the available instance 260 to process the request, as described below.

However, if in step 362 no instance of the cartridge 230 is available, the resource manager 254 determines in step 364 if the existing number of instances exceeds a maximum prescribed number. If the existing number of instances exceeds the maximum prescribed number in step 364, the resource manager 254 indicates to the dispatcher 214 that the request cannot be processed at this time. In response, the dispatcher 214 returns the request to the listener 210 in step 358, after which the web listener 210 sends a reply to the browser 202 over the network in step 360 indicating the request was not processed.

Alternatively, when a cartridge instance is not currently available to handle a request, listener 210 may place the request on a waiting list for that cartridge instance. When a cartridge instance becomes available, the revised browser request is removed from the waiting list and forwarded to the cartridge instance. If the revised browser request remains on the waiting list for more than a predetermined amount of time, listener 210 may remove the request from the waiting list and send a message to the browser 202 to indicate that the request could not be processed.

If in step 364 the existing number of instances does not exceed the maximum prescribed number, the resource manager 254 initiates a new instance of the identified program and informs the dispatcher 214 that a revised browser request based on the browser request should be sent to the new instance. The dispatcher 214 then dispatches a revised browser request to the cartridge execution engine of the new instance.

For example, assume that the resource manager 254 initiated instance 260 in response to the browser request. During the initialization, the stored sequences of instructions for the PL/SQL runtime are accessed to create a new instance 260 of the cartridge 230 in an address space that is separate from the address space in which dispatcher 214 is executing. According to one embodiment, initialization is performed by loading the cartridge execution engine 228 and having the cartridge execution engine call the initialization routine in cartridge 230.

Once the new instance 260 is running, the dispatcher 214 dispatches the request to the cartridge execution engine 228 associated with the new instance 260 in step 368. The cartridge execution engine 228 sends a callback message to the new instance 260 requesting execution of the request. In the callback message, the cartridge execution engine 228 passes any parameters necessary for the instance 260 to process the request. Such parameters may include, for example, passwords, database search keys, or any other argument for a dynamic operation executed by the instance 260.

The instance 260 then executes the request. During the execution of the request by the instance in step 368, the dispatcher 214 monitors the instance to determine the occurrence of a fault in step 370. If in step 370 the dispatcher 214 detects a fault, the dispatcher 214 calls the corresponding cartridge execution engine 228 in step 372 to abort the instance 260 having the fault. The corresponding cartridge execution engine 228 in turn issues a shut down command across the API to the faulty instance. The instance, responding to the shut down command by the cartridge execution engine 228, will shut down without affecting any other process in any other address space.

If in step 370 no fault is detected, the dispatcher 214 receives a reply from the instance 260 upon completion of execution in step 374. The dispatcher 214 in step 376 forwards the reply to the listener 210, which responds to the browser with the reply from the executed instance 260. After executing the instance 260, the dispatcher 214 in step 378 maintains the instance in the memory, as shown in step 378 to enable execution of a subsequent request.

DISTRIBUTED ARCHITECTURE OF WEB SERVER

Significantly, the various components of the web application server 280 communicate with each other using a communication mechanism that does not require the components to be executing in the same address space or even on the same machine. In the illustrated embodiment, the components of the web application server 280 are configured to communicate through an Object Request Broker (ORB) 282. Object Request Brokers are described in detail in "Common Object Request Broker: Architecture and Specification (CORBA)". This and other documents relating to CORBA can be found on the World Wide Web at http://www.omg.org.

While the embodiments of the present invention shall be described with reference to communications through a CORBA-compliant ORB, other cross-platform communication mechanisms may be used. For example, the components of web application server 280 may alternatively communicate with each other using Remote Procedure Calls (RPM), a UNIX pipe, Microsoft COM.

Because the various components of the web application server 280 communicate with each other using a machine independent communication mechanism, there are no inherent restrictions with respect to where the components are located with respect to each other. For example, listeners 210, 216 and 222 may be executing on the same machine, or on three completely different machines, each with a different operating system. Similarly, the authentication server 252, virtual path manager 250, resource manager 254 and configuration provider 256 may be executing on the same machine or on four different machines. Further, those four different machines may not have any overlap with the three machines executing listeners 210, 216 and 222.

Cartridge execution engines 228, 232 and 236 incorporate all of the necessary logic to communicate with the other components of the web application server 280 through the object request broker 282. Consequently, the location of the cartridge instances themselves is not inherently restricted by the communication mechanism. Thus, instance 260 may be executing in a completely different machine and operating system than dispatchers from which it receives requests. Likewise, instance 260 may be on a different machine and operating system than the resource manager 254 or any of the other components of the web application server 280, including instances of other cartridges that are being managed by the same web application server 280.

Significantly, the location-independence enjoyed by cartridges used by web application server 280 is achieved through the cartridge execution engine communication logic, not through any custom programming in the cartridges themselves. Consequently, the cartridges do not need to be specially designed for execution in a distributed application server environment. Cartridge designers are thus insulated from the complexities of a distributed system, and can concentrate their efforts on the logic associated with the tasks for which the cartridges were created.

PROCESSING TRANSACTIONS

According to an embodiment of the invention, transactions are implemented in a stateless environment through the use of metadata that indicates specific information for specific types of transactions. A piece of information about a transaction that is supplied in the metadata is referred to herein as an attribute of the transaction. The use of metadata to indicate specific attributes of a transaction allows for a system in which cartridges are not required to persistently maintain state information. Transactions in such a system are declarative rather than programmatic in that the messages themselves indicate the transactions to which they belong. For example, the metadata for two particular types of transactions, TX1 and TX2, could be as follows:

```
[TX1]
    [STOREFRONT]
        name = STOREACCOUNTS
        belong-to-list = /STOREFRONT
            /BANKING
        resource-list = /SEARS
            /BANK1
        begin =/storefront/open session
        commit =/storefront/commit session
        rollback =/storefront/rollback session
[TX2]
    [EMPLOYEE]
        name = EMPLOYEEACCOUNTS
        belong-to-list =/EMPLOYEE
            /BANKING
        resource-list =/PERSONNEL
            /BANK1
        begin =/employee/open session
        commit =/employee/commit session
        rollback =/employee/rollback session
```

For each type of transaction the metadata includes various attributes. According to one embodiment, the attributes include a cartridge name, a transaction name, a belong-to-list, a resource-list, begin, commit and rollback TRANSACTION URLs. In the example given above, the cartridge name for TX1, is STOREFRONT, the transaction name is STOREACCOUNTS, the belong-to-list consists of /STOREFRONT and /BANKING, the resource-list consists of /SEARS and /BANK1, the begin transaction URL is /storefront/open session, the commit transaction URL is /storefront/commit session and the rollback transaction URL is /storefront/rollback session.

The cartridge name attribute identifies the particular type of cartridge that the dispatcher communicates with to perform the operations of the transaction. The transaction name attribute uniquely identifies the type of transaction relative to other transaction types. The belong-to-list of a transaction type lists the cartridges that may participate in the performance of the transaction. The resource-list is the list of resources that are affected by the performance of transactions that are of the transaction type. The begin transaction URL is the URL that signals that a transaction of this type is about to begin. The commit transaction URL is the URL that signals that a transaction of this type that is currently in progress should be committed. The rollback transaction URL is the URL that signals that a transaction of this type that has already started should be rolled back. How each of these attribute values is used during the performance of a transaction shall be described in greater detail below.

TRANSACTION OVERVIEW

Figure 6:
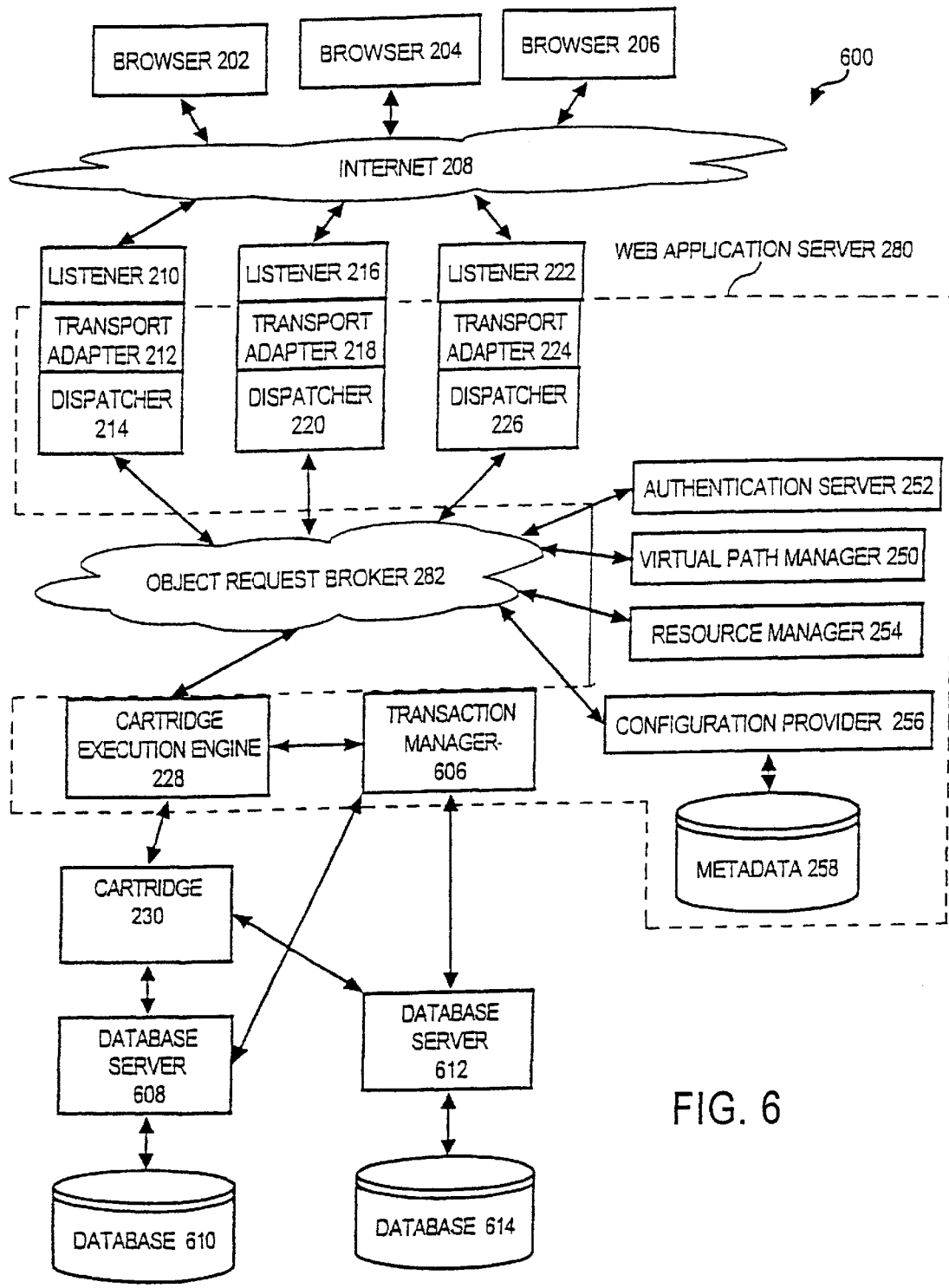
FIG. 6 is a block diagram of a distributed application server for processing transactions according to an embodiment of the invention.

FIG. 6 is a block diagram of a system 600 that provides for the processing of multiple-request transactions in a stateless environment according to one embodiment of the invention. FIG. 6 is similar to FIG. 2 and therefore like components have been numbered alike. Within this document, the term browser request and the term transaction request are used interchangeably. The term multiple-request transaction is used to refer to a single transaction that is comprised of two or more browser requests.

As described earlier, cartridge execution engine 228 communicates with a plurality of dispatchers (e.g. one or more of dispatchers 214, 220 and 226) through object request broker 282 to receive browser messages. These browser messages may be sent from a plurality of browsers connected to the Internet 208. In addition to the plurality of dispatchers, cartridge execution engine 228 also communicates with a cartridge 230, configuration provider 256 and transaction manager 606. As previously described above, the cartridge 230 represents a module of code that is either configured as a cartridge that performs a well-defined function, or as a programmable cartridge that acts as an interpreter or a routine environment for an application. The combination of cartridge execution engine 228, transaction manager 606 and cartridge 230 constitute a cartridge instance.

A particular cartridge may be associated with a plurality of database servers for access to a plurality of databases. In this example, cartridge 230 has the ability to process database transactions according to the Structured Query Language (SQL) by accessing database 610 and database 614 through database server 608 and database server 612 respectively.

Transaction manager 606 represents a coordinating module that is associated with cartridge execution engine 228 and functions to coordinate the execution of multiple-request transactions in the stateless web environment. In coordinating the execution of multiple-request transactions, transaction manager 606 retains no state information for the multiple-request transactions. The transaction manager 606 communicates with cartridge execution engine 228 to receive transaction control messages. Using the information contained in the transaction control messages, the transaction manager 606 interacts with database servers 608 and 612 to cause changes made during multiple-request transactions to respective databases 610 and 614 to be either committed or rolled back as an atomic unit of work.

IDENTIFYING TRANSACTIONS

Browser requests that are associated with multiple-request transactions include a globally unique transaction ID. The globally unique transaction ID within a browser request is used to identify the multiple-request transaction to which the browser request belongs. According to one embodiment, when a browser request is received that contains a begin transaction URL, the transaction manager creates a globally unique transaction ID. This globally unique transaction ID is returned to the sending browser, and is sent by the browser in subsequent browser requests that are associated with the same multiple-request transaction.

In certain embodiments, when returned to the browser from which a multiple-request transaction was initiated, the globally unique transaction ID associated with the particular multiple-request transaction is stored as cookie information on the client executing the browser. When a subsequent browser request is sent by the browser, the dispatcher determines if the subsequent request contains a begin transaction URL. If the request does not contain a begin transaction URL, then the dispatcher obtains the globally unique transaction ID associated with the browser request by reading the sending browser's cookie information using the HTTP protocol standards.

For example, when a browser 202 sends a first browser request associated with a transaction and a begin transaction URL, the transaction manager 606 creates a unique browser identifier and sends it to the dispatcher 214. The dispatcher 214 then causes the globally unique transaction ID to be stored as cookie information on browser 202. When browser 202 sends a second browser request that is associated with the same transaction, the dispatcher 214 obtains the globally unique transaction ID contained in the cookie information of browser 202.

Using the globally unique transaction ID, the database servers that ultimately process the browser request can determine that both the first browser request and the second browser request are associated with the same multiple-request transaction. Because a particular browser may be executing more than one transaction at a time, in certain embodiments, the cartridge name for the particular transaction is contained within each globally unique transaction ID and is used to help identify the particular transaction to which the globally unique transaction ID corresponds.

In certain situations cookie information may not be available on a particular browser. For example, a particular browser may not support the use of cookies or a particular user may choose to deny access to the browser cookie information. Therefore, in certain embodiments, the transaction identifiers are embedded in the messages returned to a browser, and sent out by the browser in subsequent browser requests. This can be accomplished by annotating the URLs that are associated with the hyperlinks of the HTML page that is returned to the browser 202. Based upon the globally unique transaction ID that is sent out as part of the browser request URL, the database servers that ultimately perform the operations specified in the browser requests can use the globally unique transaction ID to identify the multiple-request transaction to which each particular browser request belongs.

TRANSACTION CARTRIDGE INSTANTIATION

Each browser request contains URL information that is sent from the sending browser in response to a user of the browser selecting a hypertext link on an HTML page. The URL information includes a Uniform Resource Indicator (URI) portion and a header section. The URI portion includes transaction state information and a cartridge name. The transaction state information is used to identify the particular state of a multiple-request transaction. The cartridge name is used to identify the cartridge type and allows the cartridge execution engine to identify the metadata that is associated with the browser request.

The header section is used to store a globally unique transaction ID that is used by the database servers to identify the multiple-request transaction that is associated with a particular transaction request.

When a listener receives the browser request, it passes the browser request to the dispatcher. The dispatcher then communicates with the virtual path manager to determine the cartridge type that is associated with the browser request. In one embodiment, the dispatcher forwards the information contained in the URI to the virtual path manager. Using the information in the URI, the virtual path manager communicates with the configuration provider to determine the cartridge type that is associated with the browser message. Once the cartridge type is identified, the virtual path manager returns data that identifies the cartridge type to the dispatcher. The dispatcher then searches a cartridge instance pointer list that includes pointers to cartridge instances that have previously been associated with the particular dispatcher. If the dispatcher locates a pointer to a cartridge instance that is of the cartridge type that is associated with the browser request, the dispatcher uses the pointer to send a revised browser message to the cartridge instance.

If the dispatcher does not locate a pointer to the type of cartridge instance that is associated with the browser request, the dispatcher communicates with the resource manager to obtain a cartridge instance of that type. In obtaining the cartridge instance, the dispatcher sends a message to the resource manager that includes the cartridge type that was previously identified by the virtual path manager.

Upon receiving the dispatcher message, the resource manager determines if a cartridge instance of the request type is available for use by searching a cartridge instance pointer table. If a cartridge instance pointer of the requested type is located in the cartridge instance pointer table, the resource manager sends a pointer to the available cartridge instance back to the dispatcher.

However, if a cartridge instance of the requested type is not available, the resource manager causes a cartridge instance of the request type to be instantiated. In one embodiment of the invention, the resource manager causes a cartridge instance of the requested type to be instantiated by requesting a particular cartridge factory process to create a cartridge instance of the request type. Cartridge factory processes may be located across multiple machines. When a particular cartridge factory process is requested to instantiate a cartridge instance, it instantiates the cartridge instance on the same machine that the cartridge factory is currently executing on. Therefore, the resource manager selects which cartridge factory to use based on the particular machine the resource manager chooses to instantiate the cartridge instance.

Upon receiving a request to instantiate a cartridge instance, the cartridge factory process instantiates an instance of a cartridge execution engine. Once the cartridge execution engine is instantiated, the cartridge execution engine obtains the transaction information, if any, that is associated with the requested cartridge type. For example, if the requested cartridge type is of type STOREFRONT as described in TX1 above, the cartridge execution engine obtains and stores the metadata information that is associated with TX1. This metadata information is used by the cartridge instance to process transactions.

After obtaining the metadata information, the cartridge execution engine instantiates a cartridge of the requested cartridge type. The instance of the cartridge that is created is dynamically linked with the cartridge execution engine. The cartridge execution engine then instantiates a transaction manager. The transaction manager instance is dynamically linked with the cartridge and the cartridge execution engine to form a cartridge instance.

Once the cartridge instance is formed, the transaction manager uses the metadata information that was previously stored by the cartridge execution engine to open connections with the databases that were identified in the resource-list of the metadata. These connections are retained by the transaction manager and later used to provide database handles to the associated cartridge and to control the processing of multiple-request transactions. For example, if the requested cartridge type is of type STOREFRONT, the resource-list is associated with a SEARS and BANK1 database. Using the resource-list information, the transaction manager opens a connection with the SEARS database and the BANK1 database by respectively establishing connections with the database servers associated with the SEARS and BANK1 databases. These connections are retained by the transaction manager and are used for processing transactions of type TX1.

After the transaction manager establishes its connections with the appropriate databases (i.e. through the database servers associated with the appropriate databases), the cartridge execution engine notifies the cartridge factory that a cartridge instance has been instantiated by returning a pointer to the cartridge instance back to the cartridge factory. Upon receiving the cartridge instance pointer, the cartridge factory sends the cartridge instance pointer to the resource manager.

The resource manager then registers the cartridge instance pointer into its cartridge instance pointer table. The resource manager then sends the cartridge instance pointer to the dispatcher. Upon receiving the cartridge instance pointer from the resource manager, the dispatcher stores the cartridge instance pointer into its associated cartridge instance pointer list. The dispatcher then uses the cartridge instance pointer to send a revised browser message to the cartridge instance.

CREATING REVISED BROWSER MESSAGES

Upon obtaining a cartridge instance pointer, the dispatcher creates a revised browser message using the information associated with the browser request. This revised browser message includes the URI, header information, the cartridge type and a dispatcher pointer that allows messages to be returned to the dispatcher. For example, a revised message for a transaction of type TX1 as described above, may include the following information:

URI=/storefront/open_session
header=NULL
cartridge name=[STOREFRONT]
dispatcher pointer=address XXXXX In this example, the URI is a begin transaction URI (a URI that is used by the cartridge execution engine to identify the beginning of a multiple-request transaction). Because the URI is a begin transaction URI, a globally unique transaction ID has not yet been associated with the multiple-request transaction. Hence, the header that would contain the transaction ID is set to NULL. For ongoing multiple-request transactions (i.e. when the browser request does not contain a URI of /storefront/open_session)and in which cookies are used to store the globally unique transaction ID, the header will contain the unique transaction ID. This unique transaction ID allows the database servers to associate a transaction request with an ongoing multiple-request transaction.

The cartridge name identifies the cartridge type and is used by the cartridge execution engine to identify the metadata that contains information about the transaction type associated with the particular browser request. In this example, the cartridge name of STOREFRONT identifies the metadata associated with TX1 as being associated with the browser request.

After creating the revised browser message, the dispatcher uses the previously obtained cartridge instance pointer to send the revised browser message to the cartridge instance. When the cartridge instance receives the revised browser message, the cartridge instance uses the cartridge type information to identify the metadata that is associated with the browser request. After identifying the metadata, the cartridge execution engine uses the URI information to determine the state of the transaction associated with the browser request.

For example, it shall be assumed that the browser request included a URI of "/storefront/open_session" and a cartridge type of STOREFRONT.

By looking at the metadata associated with the cartridge type of STOREFRONT (i.e. the metadata described in TX1 above), the cartridge execution engine 228 determines that the URI of /storefront/open_session corresponds to a "begin" transaction state. Using this same mechanism, the cartridge execution engine 228 can determine that a browser request containing a URI of /storefront/commit_session corresponds to a "commit" transaction state and that a browser request containing a URI of /storefront/rollback_session corresponds to a "rollback" transaction state.

In the case where the URI does not include a particular state (i.e. a URI consisting only of /storefront), the cartridge execution engine 228 assumes that the browser request is associated with an ongoing multiple-request transaction that is not ready to be either committed or rolled backed.

When the cartridge execution engine receives a revised browser message that is not associated with a "begin" transaction, the cartridge execution engine checks the header to determine if it specifies a globally unique transaction ID. If the header specifies a globally unique transaction ID, then cookie information was used to store the globally unique transaction ID. If the header does not specify a globally unique transaction ID, the cartridge execution engine then searches the URI to identify the globally unique transaction ID that is associated with the browser request. Once the cartridge execution engine locates the globally unique transaction ID, the cartridge execution engine includes the transaction ID in the transaction control messages that are sent to the transaction manager. The transaction manager then uses the globally unique transaction ID in communicating with the associated database servers to cause multiple-request transactions to be either committed or rolled back as an atomic unit of work.

PROCESSING TRANSACTIONS

FIG. 7A through 7I are a flow diagram illustrating a method for processing multiple-request transactions in a stateless environment according to an embodiment of the invention.

At step 702, a revised browser message that was directed to cartridge 230 is intercepted by cartridge execution engine 228. For the purposes of explanation, it shall be assumed that the revised browser message was sent by dispatcher 214 and that the revised browser message is associated with transaction TX1 as described above.

At step 704, cartridge execution engine 228 determines if the revised browser message is associated with a transaction. If the revised browser message is not associated with a transaction, at step 706, cartridge execution engine 228 forwards the revised browser message to cartridge 230 for cartridge 230 to perform the requested non-transactional functions associated with the revised browser message. Once the cartridge performs the requested non-transactional functions, control returns to step 702 in order for the cartridge execution engine 228 to intercept the next revised browser message.

Otherwise, if the revised browser message is associated with a transaction, at step 708, cartridge execution engine 228 determines the state of the transaction by first determining whether the revised browser message is associated with a begin transaction URI. In determining whether the revised browser message is associated with a begin transaction URI, the cartridge execution engine 228 uses the cartridge name to identify the previously stored metadata that includes the transaction attributes of the transaction type identified in the revised browser message. Using the previously stored metadata, the cartridge execution engine 228 determines if the revised browser message is associated with a begin transaction URI.

For example, it shall be assumed that the revised browser message contained a cartridge name of STOREFRONT and a URI of /storefront/open_session. Using the STOREFRONT cartridge name, the cartridge execution engine 228 determines that the revised browser message is associated with the metadata for transaction TX1. Using this metadata, the cartridge execution engine 228 determines that the URI of /storefront/open_session is associated with a begin transaction.

If the cartridge execution engine 228 determines that the revised browser message is not associated with a begin transaction, then control proceeds to step 744.

If the cartridge execution engine 228 determines that the revised browser message is associated with a begin transaction, then at step 712, the cartridge execution engine 228 includes a begin transaction identifier (tx_begin) in a transaction control message. The cartridge execution engine 228 then sends the transaction control message to the transaction manager 606.

At step 714, upon receiving the begin transaction identifier, the transaction manager 606 creates a globally unique transaction ID that is used to identify subsequent browser requests that are associated with this multiple request transaction. In certain embodiments of the invention, the transaction ID is formed using the browser IP address, the transaction name and a particular timestamp value.

At step 716, the cartridge execution engine 228 sends an operation message to cartridge 230 that is formed from information that is contained in the revised browser message. The operation message also includes a dispatcher pointer that identifies the dispatcher that sent the revised browser request (dispatcher 214). This pointer allows the cartridge 230 to write information back to the dispatcher. At step 718, upon receiving the operation message, the cartridge 230 sends a message to the transaction manager 606 requesting handles for access to the databases that are associated with the transaction.

At step 720, transaction manager 606 returns handles to the appropriate database servers to allow the cartridge 230 to process the transaction request. For example, assuming database 610 is associated with the SEARS database and database 614 is associated with the BANK1 database, transaction manager 606 will return handles to database server 608 and 612 respectively.

At step 722, cartridge 230 uses the handles returned from transaction manager 606 to execute the operations identified in the operation message that was sent by the cartridge execution engine 228.

At step 724, the cartridge 230 determines whether the sending browser allows cookie information to be associated with the browser. If the browser does not allow for cookie information to be associated with the browser, at step 726, the cartridge 230 causes the hyperlinks of the HTML page that was generated in response to executing this transaction request to be annotated to include the globally unique transaction ID. By annotating the hyperlinks of the HTML page, the URIs contained in subsequent browser request will contain the globally unique transaction ID.

At step 728, the cartridge 230 uses the dispatcher pointer to return back to the dispatcher 214 the HTML page that was generated in response to executing the transaction request. The cartridge 230 then notifies cartridge execution engine 228 that execution of the transaction request is complete.

At step 730, the cartridge execution engine 228 sends a message to the transaction manager 606 requesting it to suspend the transaction. At step 732, the transaction manager 606 sends a suspend request to database servers 608 and 612 to cause them to suspend execution of the transaction. The suspend request includes the globally unique transaction ID so that the database servers 608 and 612 know which transaction to suspend. By sending a suspend request to database servers 608 and 612, it allows other browsers to execute transactions that are associated with databases 610 and 614.

At step 734, transaction manager 606 sends the globally unique transaction ID to the cartridge execution engine 228. At step 736, the cartridge execution engine 228 determines whether the sending browser allows for cookie information to be associated with the browser. If the browser does not allow for cookie information to be associated with the browser, at step 738, the dispatcher 214 is notified that the processing of the revised browser request is complete. Control then returns to step 702 to intercept another revised browser message.

If the browser does allow for cookie information to be associated with the browser, at step 740, the cartridge execution engine 228 uses the globally unique transaction ID to create cookie information to be associated with the sending browser.

At step 742, cartridge execution engine 228 forwards the cookie information to dispatcher 214 so that it may be transmitted to the sending browser and notifies the dispatcher 214 that the processing of the revised browser request is complete. Control then returns to step 702 to intercept another revised browser message.

At step 744, the cartridge execution engine 228 determines whether the revised browser message is associated with a commit transaction URI. In determining whether the revised browser message is associated with a commit transaction URI, the cartridge execution engine 228 uses the cartridge name to identify the previously stored metadata for the type of transaction associated with the revised browser message. Using the previously stored metadata, the cartridge execution engine 228 determines if the revised browser message is associated with a commit transaction URI.

For example, it shall be assumed that the revised browser message contained a cartridge name of STOREFRONT and a URI of /storefront/commit_session. Using the STOREFRONT cartridge name, the cartridge execution engine 228 determines that the revised browser message is associated with the metadata for transaction TX1. Using this metadata, the cartridge execution engine 228 determines that the URI of /storefront/commit_session is associated with a commit transaction.

If the cartridge execution engine 228 determines that the revised browser message is not associated with a commit transaction, then control proceeds to step 774.

If the cartridge execution engine 228 determines that the revised browser message is associated with a commit transaction, then at step 746, the cartridge execution engine 228 determines whether the header section of the revised browser message contains cookie information. If cartridge execution engine 228 determines that the header section of the revised browser message contains cookie information, then at step 748 the cartridge execution engine 228 extracts the globally unique transaction ID from the cookie information. Control then proceeds to 752.

If cartridge execution engine 228 determines that the header section of the revised browser message does not contain cookie information, then at step 750 the cartridge execution engine 228 extracts the globally unique transaction ID from the annotated URI.

At step 752, the cartridge execution engine 228 packages a resume transaction identifier (tx_resume) into a transaction control message. The cartridge execution engine 228 then sends the transaction control message to the transaction manager 606.

At step 754, upon receiving the resume transaction identifier, the transaction manager 606 sends a resume request to database servers 608 and 612 to cause them to resume execution of the transaction. The resume request includes the globally unique transaction ID which allows the database servers 608 and 612 to identify the multiple-request transaction that is associated with the current transaction request.

At step 756, the cartridge execution engine 228 sends an operation message to cartridge 230 that is based on the transaction information contained in the revised browser message. The operation message also contains a dispatcher pointer that identifies the dispatcher that sent the revised browser request (dispatcher 214) and allows the cartridge 230 to write information back to the dispatcher. At step 758, upon receiving the operation message, the cartridge 230 sends a message to the transaction manager 606 requesting handles for access to the databases that are associated with the transaction.

At step 760, transaction manager 606 returns handles to the appropriate database servers to allow the cartridge 230 to process the transaction request. For example, assuming database 610 is associated with the SEARS database and database 614 is associated with the BANK1 database, transaction manager 606 will return handles to database server 608 and 612 respectively.

At step 762, cartridge 230 uses the handles returned from transaction manager 606 to execute the operation specified by the operation message that was sent by the cartridge execution engine 228.

At step 764, the cartridge 230 determines whether the sending browser allows cookie information to be associated with the browser. If the browser does not allow for cookie information to be associated with the browser, at step 766, the cartridge 230 causes the globally unique transaction ID to be removed from the annotated hyperlinks of any HTML page that is associated with the transaction. By removing the transaction ID annotations from the hyperlinks of the HTML page, subsequent browser requests that are issued in response to selection of a hyperlink from the HTML page will not contain the globally unique transaction ID and, therefore, will not be mistakenly associated with this multiple-request transaction.

At step 768, the cartridge 230 uses the dispatcher pointer to return the HTML page generated in response to performing the operation specified in the browser request to the dispatcher 214 and notifies cartridge execution engine 228 that execution of the transaction request is complete.

At step 770, the cartridge execution engine 228 sends a transaction control message to the transaction manager 606 requesting it to commit the transaction. At step 771, the transaction manager 606 sends a commit request to database servers 608 and 612 to cause all changes made in response to the various browser requests that belonged to the multiple-request transaction to be committed as an atomic unit of work. The commit request includes the globally unique transaction ID which allows the database servers 608 and 612 to identify the associated multiple-request transaction.

At step 772, the cartridge execution engine 228 notifies the dispatcher 214 that the processing of the revised browser request is complete and signals the dispatcher 214 to cause the cookie information associated with the committed multiple-request transaction to be removed from the sending browser. By removing the transaction ID from the cookie information associated with the sending browser, subsequent browser requests will not contain the globally unique transaction ID and, therefore, will not be mistakenly associated with the committed multiple-request transaction. Control then returns to step 702 to intercept another revised browser message.

At step 774, the cartridge execution engine 228 determines whether the revised browser message is associated with a rollback transaction URI. In determining whether the revised browser m message is associated with a rollback transaction URI, the cartridge execution engine 228 uses the cartridge name to identify the previously stored metadata that corresponds to the transaction type indicated in the revised browser message. Using the previously stored metadata, the cartridge execution engine 228 determines if the revised browser message contains a rollback transaction URI.

For example, it shall be assumed that the revised browser message contained a cartridge name of STOREFRONT and a URI of /storefront/ rollback_session. Using the STOREFRONT cartridge name, the cartridge execution engine 228 determines that the revised browser message is associated with the metadata for transaction TX1. Using this metadata, the cartridge execution engine 228 determines that the URI of /storefront/ rollback_session is associated with a rollback transaction.

If the cartridge execution engine 228 determines that the revised browser message is not associated with a rollback transaction, then control proceeds to step 804.

If the cartridge execution engine 228 determines that the revised browser message is associated with a rollback transaction, then at step 776, the cartridge execution engine 228 determines whether the header section of the revised browser message contains cookie information. If cartridge execution engine 228 determines that the header section of the revised browser message contains cookie information, then at step 778 the cartridge execution engine 228 extracts the globally unique transaction ID from the cookie information. Control then proceeds to 782.

If cartridge execution engine 228 determines that the header section of the revised browser message does not contain cookie information, then at step 780 the cartridge execution engine 228 extracts the globally unique transaction ID from the annotated URI.

At step 782, the cartridge execution engine 228 incorporates a resume transaction identifier (tx_resume) in a transaction control message. The cartridge execution engine 228 then sends the transaction control message to the transaction manager 606.

At step 784, upon receiving the resume transaction identifier, the transaction manager 606 sends a resume request to database servers 608 and 612 to cause them to resume execution of the transaction. The resume request includes the globally unique transaction ID which allows the database servers 608 and 612 to identify the multiple-request transaction that is associated with the current transaction request.

At step 786, the cartridge execution engine 228 sends an operation message to cartridge 230 that is based on the transaction information contained in the revised browser message. The operation message also contains a dispatcher pointer that identifies the dispatcher that sent the revised browser request (dispatcher 214) and allows the cartridge 230 to write information back to the dispatcher. At step 788, upon receiving the operation message, the cartridge 230 sends a message to the transaction manager 606 requesting handles for access to the databases that are used in the specified type of transaction.

At step 790, transaction manager 606 returns handles to the appropriate database servers to allow the cartridge 230 to process the transaction request. For example, assuming database 610 is associated with the SEARS database and database 614 is associated with the BANK1 database, transaction manager 606 will return handles to database server 608 and 612 respectively.

At step 792, cartridge 230 uses the handles returned from transaction manager 606 to execute the transaction information associated with the operation message that was sent by the cartridge execution engine 228.

At step 794, the cartridge 230 determines whether the sending browser allows cookie information to be associated with the browser. If the browser does not allow for cookie information to be associated with the browser, at step 796, the cartridge 230 causes the globally unique transaction ID to be removed from the annotated hyperlinks of any HTML page to be returned to the browser. By removing the transaction ID annotations from the hyperlinks of the HTML page, subsequent browser requests will not contain the globally unique transaction ID and, therefore, will not be mistakenly associated with this multiple-request transaction.

At step 798, the cartridge 230 uses the dispatcher pointer to return the HTML page that is associated with executing the transaction back to the dispatcher 214 and notifies cartridge execution engine 228 that execution of the transaction request is complete.

At step 800, the cartridge execution engine 228 sends a transaction control message to the transaction manager 606 requesting it to rollback the transaction. At step 801, the transaction manager 606 sends a rollback request to database servers 608 and 612 to cause all changes made in response to the browser requests that belong to the multiple-request transaction to be rolled back as an atomic unit of work. The roll back request includes the globally unique transaction ID which allows the database servers 608 and 612 to identify and roll back the correct multiple-request transaction.

At step 802, the cartridge execution engine 228 notifies the dispatcher 214 that the processing of the revised browser request is complete and signals the dispatcher 214 to cause the cookie information associated with the rolled back multiple-request transaction to be removed from the sending browser. By removing the transaction ID from the cookie information associated with the sending browser, subsequent browser requests will not contain the globally unique transaction ID and, therefore, will not be mistakenly associated with the rolled back multiple-request transaction. Control then returns to step 702 to intercept another revised browser message.

At step 804, the cartridge execution engine 228 determines whether the header section of the revised browser message contains cookie information. If cartridge execution engine 228 determines that the header section of the revised browser message contains cookie information, then at step 806 the cartridge execution engine 228 extracts the globally unique transaction ID from the cookie information. Control then proceeds to 810.

If cartridge execution engine 228 determines that the header section of the revised browser message does not contain cookie information, then at step 808 the cartridge execution engine 228 extracts the globally unique transaction ID from the annotated URI.

At step 810, the cartridge execution engine 228 packages a resume transaction identifier (tx_resume) in a transaction control message. The cartridge execution engine 228 then sends the transaction control message to the transaction manager 606.

At step 812, upon receiving the resume transaction identifier, the transaction manager 606 sends a resume request to database servers 608 and 612 to cause them to resume execution of the transaction. The resume request includes the globally unique transaction ID which allows the database servers 608 and 612 to identify the multiple-request transaction that is associated with the current transaction request.

At step 814, the cartridge execution engine 228 sends an operation message to cartridge 230 that is based on the transaction information contained in the revised browser message. The operation message also contains a dispatcher pointer that identifies the dispatcher that sent the revised browser request (dispatcher 214) and allows the cartridge 230 to write information back to the dispatcher. At step 816, upon receiving the operation message, the cartridge 230 sends a message to the transaction manager 606 requesting handles for access to the databases that are associated with the transaction.

At step 818, transaction manager 606 returns handles to the appropriate database servers to allow the cartridge 230 to process the transaction request. For example, assuming database 610 is associated with the SEARS database and database 614 is associated with the BANK1 database, transaction manager 606 will return handles to database servers 608 and 612 respectively.

At step 820, cartridge 230 uses the handles returned from transaction manager 606 to execute the operation specified in the operation message that was sent by the cartridge execution engine 228.

At step 822, the cartridge 230 determines whether the sending browser allows cookie information to be associated with the browser. If the browser does not allow for cookie information to be associated with the browser, at step 824, the cartridge 230 causes the hyperlinks of an HTML page generated in response to performing the operation to be annotated to include the globally unique transaction ID. By annotating the hyperlinks of the HTML page, the URIs in subsequent browser requests that are issued in response to selecting the links in the HTML page will contain the globally unique transaction ID.

At step 826, the cartridge 230 uses the dispatcher pointer to return the HTML page thus generated back to the dispatcher 214 and notifies cartridge execution engine 228 that execution of the transaction request is complete.

At step 828, the cartridge execution engine 228 sends a message to the transaction manager 606 requesting it to suspend the transaction. At step 830, the transaction manager 606 sends a suspend request to database servers 608 and 612 to cause them to suspend execution of the transaction. The suspend request includes the globally unique transaction ID which allows the database servers 608 and 612 to accurately identify the multiple-request transaction to be suspended. Control then returns to step 702 to intercept another revised browser message.

TRANSACTION TIMEOUTS

According to one embodiment of the invention, a timeout value is associated with each transaction. The timeout value is used to identify multiple-request transactions that have not been active for a specified time period. In one embodiment, each database server maintains a timeout value for the multiple-request transactions that are being serviced by the database server. Thus, whenever a multiple-request transaction begins to execute, the associated database server initializes the timeout value for the particular transaction. Upon receiving a resume transaction request that is associated with a globally unique transaction ID, the database server resets the timeout value for the multiple-request transaction that is associated with the globally unique transaction ID. If a multiple-request transaction times out, the database server causes all changes made as part of the multiple-request transaction to be rolled back as an atomic unit of work. Once the multiple-request transaction is rolled back, a message is then sent to the associated browser to indicate the state of the transaction.

CONDUCTING TRANSACTIONS IN A STATELESS WEB ENVIRONMENT

The present invention provides a practical and highly scalable mechanism for conducting multiple-request transactions in a stateless environment, such as the web. According to the invention, a transaction manager is used to coordinate the overall transaction process. Preferably, the transaction manager coordinates the process in such a way that state information is maintained for a transaction without requiring the transaction manager itself to persistently maintain the state information.

In a preferred embodiment, processing of a client request is performed as follows. The transaction manager receives a request from a client, and if the request is a transaction request, the manager initiates a transaction with a transaction processing mechanism, such as a database management system (DBMS). Once the transaction is initiated, the manager preferably forwards the request to another entity, such as an application, which actually processes the request. After the request is processed, control is returned to the manager, and at that point, the manager assembles a set of state information associated with the transaction. This state information may include the identity of the client, the ID and status of the transaction, and what has already transpired in the transaction. Once assembled, the state information, along with the response to the client request, is sent back to the client to be maintained by the client. The state information may be sent to the client in the form of a "cookie" or it may be incorporated into a URL that is returned to the client. While it is possible to do so, state information is preferably not persistently maintained by the manager or by the application that processed the request.

When the client submits a second request relating to the same transaction, the client sends along the state information previously provided by the manager. Upon receiving the second request, the manager extracts the state information from the request, and uses it to resume the previously initiated transaction with the DBMS. Once the transaction is resumed, the manager sends the second request, including the state information, to another entity (the same or a different application) for processing. After the second request is processed, the manager updates the state information associated with the transaction, and sends the updated state information, along with the response to the second request, to the client. The client will send this updated state information in a future request to resume the transaction. This process repeats until the transaction is either committed or rolled back.

The present invention provides several significant advantages. First, note that the transaction manager and the applications that process the requests remain stateless. That is, the transaction manager and the applications are not required to maintain any of the state information for the transaction. All of that information is maintained by the client. This means that no overhead is incurred for storing the information. More importantly, the fact that the client maintains its own state information means that any request from the client can be processed by any thread, process, or node. This significantly improves scalability because it eliminates the need to have a dedicated process or thread for each client.

Another point to note is that even though the client is maintaining the state information, the client is not aware that it is maintaining transaction-specific state information. As discussed above, the state information is provided to the client by the transaction manager. The client simply sends this information back to the transaction manager when it makes its next request. The client is not, nor does it need to be, aware that it is maintaining state information. This is a very advantageous aspect of the present invention because it obviates the need to put any state management logic on the client. This in turn means that no changes or additions need to be made to the client for the present invention to operate properly.

Hence, the present invention provides a practical, scalable, and effective mechanism for conducting transactions in a stateless environment. These and other advantages of the invention will become apparent as the invention is described in further detail.

INCORPORATION OF STATE INFORMATION IN URLS

The present invention provides an effective and highly scalable mechanism for supporting multiple-request operations (including but not limited to transactions) in a stateless environment, such as the web. According to the invention, a server is preferably used to coordinate the overall processing of client requests. Preferably, the server performs this coordination function in such a way that: (1) state information associated with multiple-request operations is maintained by the clients making the requests; (2) the clients are unaware that they are maintaining operation-specific state information; and (3) the server itself is not required to persistently maintain the state information, thereby remaining stateless.

In a preferred embodiment, processing of a client request is performed as follows. The server receives a request from a client, and if the request is for a multiple-request operation, the server initiates an operation. Once the operation is initiated, the server may either forward the request to another entity (such as an application) for processing, or the server may process the request itself. After the request is processed, the server assembles a set of state information associated with the operation. This state information may include the identity of the client, the ID and status of the operation, what has already transpired in the operation, and any other context information associated with the operation.

Once assembled, the state information is incorporated into a URL. This URL, along with the response to the client request, is sent back to the client to be maintained by the client. This state information is preferably not persistently maintained by the server.

When the client submits a second request relating to the same operation, the client sends the URL that was previously provided by the server which contains the state information. Upon receiving the second request, the server extracts the state information from the URL, and uses it to resume the previously initiated operation. With the benefit of this state information, the server can resume the operation at the exact point at which the previous request stopped. Once the operation is resumed, the server either processes the request, or forwards it to another entity for processing. After the second request is processed, the server updates the state information associated with the operation, and incorporates the updated state information into another URL. This URL, along with the response to the second request, is sent back to the client to be maintained by the client. The client will send this URL in a future request to resume the operation. This process repeats until the operation is either completed or canceled.

The present invention provides several significant advantages. First, note that the server remains stateless. That is, the server is not required to maintain any of the state information for the transaction. All of that information is maintained by the client. This means that no overhead is incurred for storing the information. More importantly, the fact that the client maintains its own state information means that any request from the client can be processed by any thread, process, or node. This significantly improves scalability because it eliminates the need to have a dedicated process or thread for each client.

Another point to note is that even though the client is maintaining the state information, the client is not aware that it is maintaining operation-specific state information. As discussed above, the state information is provided by the server to the client in the form of a URL. The client simply sends this URL whenever it requests service from the server. The client treats this URL like any other URL. The client is not, nor does it need to be, aware that this URL contains state information. This is a very advantageous aspect of the present invention because it obviates the need to put any state management logic on the client. This in turn means that no changes or additions need to be made to the client for the present invention to operate properly.

Hence, the present invention provides a practical, scalable, and effective mechanism for supporting multiple-request operations in a stateless environment. These and other advantages of the invention will become apparent as the invention is described in further detail.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method performed by a server for maintaining state in a stateless server environment, comprising the steps of:
   receiving a message from a client requesting performance of an operation;
   initiating said operation in response to receiving said request;
   assembling state information associated with said operation;
   determining whether said client will allow said server to cause said state information to be stored at said client;
   if said client will allow said server then
      generating a cookie based on said state information; and
      sending said cookie to said client to be used by said client in future requests to said server;
   if said client will not allow said server then
      incorporating said state information into a first universal resource locator (URL); and
      sending said first URL to said client to be used by said client in future requests to said server;
   wherein said server is not required to persistently maintain said state information, thereby remaining stateless.

2. The method of claim 1, wherein said client maintains said state information in said first URL without being aware that it is maintaining operation-specific state information.

3. The method of claim 1, further comprising the steps of:
   receiving a second request from said client, said second request including said first URL;
   extracting said state information from said first URL; and
   using said state information to resume said operation.

4. The method of claim 3 further comprising the steps of:
   assembling updated state information associated with said operation;
   incorporating said updated state information into a second URL; and
   sending said second URL to said client to be used by said client in another future request.

5. The method of claim 4 wherein said client maintains said state information in said first URL, and said updated state information in said second URL, without being aware that it is maintaining operation-specific state information.

6. The method of claim 1, wherein the step of incorporating said state information includes the step of incorporating said state information into a universal resource locator (URL) that is associate with a link in a Web page.

7. The method of claim 1 wherein:
   the step of incorporating said state information into a universal resource locator (URL) comprises the steps of:
      determining that said state information cannot be stored as a cookie at said client; and
      generating an HTML document that includes one or more hypertext links that store the state information; and
   wherein the step of sending said first URL to said client comprises the step of sending said HTML document to said client from said server.

8. The method of claim 1 further comprising the step of said server using said state information to commit a multi-request transaction, that includes said operation, as an atomic unit of work.

9. The method of claim 1 wherein:
   the step of receiving a request from a client includes the step of receiving a first browser message that includes a begin transaction command; and
   the method further comprising the step of in response to receiving said first browser message that includes the begin transaction command, sending a begin message to a transaction manager to cause said transaction manager to begin a transaction.

10. The method of claim 9 further comprising the steps of:
receiving a second browser message that includes a commit transaction command; and
in response to receiving said second browser message that includes the commit transaction command, sending a commit message to a transaction manager to cause said transaction manager to commit said transaction.

11. The method of claim 9 further comprising the steps of:
receiving a second browser message that includes a rollback transaction command; and
in response to receiving said second browser message that includes the rollback transaction command, sending a rollback message to a transaction manager to cause said transaction manager to roll back said transaction.

12. The method of claim 11 wherein the step of sending said rollback message includes the step of sending rollback messages to one or more database servers, wherein the rollback messages cause said one or more database servers to roll back changes associated with said transactions as an atomic unit of work.

13. The method of claim 9, further comprising the step of receiving said begin transaction command at said server in response to selection of a control associated with a tag of a Web page displayed at said client.

14. The method of claim 9, further comprising the step of receiving said commit transaction command at said server in response to selection of a control associated with a tag of a Web page displayed at said client.

15. The method of claim 9, further comprising the step of receiving said rollback transaction command at said server in response to selection of a control associated with a tag of a Web page displayed at said client.

16. The method of claim 1, wherein:
said operation is performed as part of an in-progress transaction; and
said state information indicates a state of said in-progress transaction.

17. The method of claim 1, wherein:
said operation is part of a database transaction; and
said step of sending said first URL to said client is performed while said database transaction has neither been committed or rolled back.

18. A computer-readable medium having stored thereon sequences of instructions for maintaining state in a stateless server environment, the sequence of instructions including instructions for a server performing the steps of:
receiving a message from a client requesting performance of an operation;
initiating said operation in response to receiving said request;
assembling state information associated with said operation;
determining whether said client will allow said server to cause said state information to be stored at said client;
if said client will allow said server then
generating a cookie based on said state information; and
sending said cookie to said client to be used by said client in future requests to said server;
if said client will not allow said server then
incorporating said state information into a first universal resource locator (URL); and
sending said first URL to said client to be used by said client in future requests to said server;
wherein said server is not required to persistently maintain said state information, thereby remaining stateless.

19. The computer-readable medium of claim 18, wherein said client maintains said state information in said first URL without being aware that it is maintaining operation-specific state information.

20. The computer-readable medium of claim 18, wherein the computer-readable medium further comprises instructions for performing the steps of:
receiving a second request from said client, said second request including said UR first URL;
extracting said state information from said first URL; and
using said state information to resume said operation.

21. The computer-readable medium of claim 20, wherein the computer-readable medium further comprises instructions for performing the steps of:
assembling updated state information associated with said operation;
incorporating said updated state information into a second URL; and
sending said second URL to said client to be used by said client in another future request.

22. The computer-readable medium of claim 21, wherein said client maintains said state information in said first URL, and said updated state information in said second URL, without being aware that it is maintaining operation-specific state information.

23. The computer-readable medium of claim 18, wherein the step of incorporating said state information includes the step of incorporating said state information into a universal resource locator (URL) that is associate with a link in a Web page.

24. The computer-readable medium of claim 18 wherein:
the step of incorporating said state information into a universal resource locator (URL) comprises the steps of:
determining that said state information cannot be stored as a cookie at said client; and
generating an HTML document that includes one or more hypertext links that store the state information; and
wherein the step of sending said first URL to said client comprises the step of sending said HTML document to said client from said server.

25. The computer-readable medium of claim 18 further comprises instructions for performing the step of said server using said state information to commit a multi-request transaction, that includes said operation, as an atomic unit of work.

26. The computer-readable medium of claim 18 wherein:
the step of receiving a request from a client includes the step of receiving a first browser message that includes a begin transaction command; and
the computer-readable medium further comprises instructions for performing the step of in response to receiving said first browser message that includes the begin transaction command, sending a begin message to a transaction manager to cause said transaction manager to begin a transaction.

27. The computer-readable medium of claim 26 further comprises instructions for performing the steps of:
receiving a second browser message that includes a commit transaction command; and
in response to receiving said second browser message that includes the commit transaction command, sending a commit message to a transaction manager to cause said transaction manager to commit said transaction.

28. The computer-readable medium of claim 26 further comprises instructions for performing the steps of:
  receiving a second browser message that includes a rollback transaction command; and
  in response to receiving said second browser message that includes the rollback transaction command, sending a rollback message to a transaction manager to cause said transaction manager to roll back said transaction.

29. The computer-readable medium of claim 28 wherein the step of sending said rollback message includes the step of sending rollback messages to one or more database servers, wherein the rollback messages cause said one or more database servers to roll back changes associated with said transactions as an atomic unit of work.

30. The computer-readable medium of claim 26, further comprises instructions for performing the step of receiving said begin transaction command at said server in response to selection of a control associated with a tag of a Web page displayed at said client.

31. The computer-readable medium of claim 26, further comprises instructions for performing the step of receiving said commit transaction command at said server in response to selection of a control associated with a tag of a Web page displayed at said client.

32. The computer-readable medium of claim 26, further comprises instructions for performing the step of receiving said rollback transaction command at said server in response to selection of a control associated with a tag of a Web page displayed at said client.

33. The computer-readable medium of claim 18, wherein:
  said operation is performed as part of an in-progress transaction; and
  said state information indicates a state of said in-progress transaction.

34. The computer-readable medium of claim 18, wherein:
  said operation is part of a database transaction; and
  said step of sending said first URL to said client is performed while said database transaction has neither been committed or rolled back.

35. A system for maintaining a state in a stateless server environment, the system comprising:
  a memory;
  one or more processors coupled to the memory; and
  a set of computer instructions contained in the memory, the set of computer instructions including computer instructions which when executed by the one or more processors, cause the one or more processors to perform the steps of:
    receiving, at a server, a message from a client requesting performance of an operation;
    initiating said operation in response to receiving said request;
    assembling state information associated with said operation;
    determining whether said client will allow said server to cause said state information to be stored at said client;
    if said client will allow said server then
      generating a cookie based on said state information; and
      sending said cookie to said client to be used by said client in future requests to said server;
    if said client will not allow said server then
      incorporating said state information into a first universal resource locator (URL); and
      sending said first URL to said client to be used by said client in future requests to said server;
    wherein said server is not required to persistently maintain said state information, thereby remaining stateless.

36. The system of claim 35, wherein said client maintains said state information in said first URL without being aware that it is maintaining operation-specific state information.

37. The system of claim 35, wherein the server is further configured to:
  receive a second request from said client, said second request including said first URL;
  extract said state information from said first URL; and
  use said state information to resume said operation.

38. The system of claim 37, wherein the server is further configured to:
  assemble updated state information associated with said operation;
  incorporate said updated state information into a second URL; and
  send said second UTRL to said client to be used by said client in another future request.

39. The system of claim 38, wherein the client is configured to maintain said state information in said first URL, and said updated state information in said second URL, without being aware that it is maintaining operation-specific state information.

* * * * *

UNITED STATES PATENT AND TRADEMARK OFFICE
CERTIFICATE OF CORRECTION

PATENT NO. : 6,225,995 B1
DATED : May 1, 2001
INVENTOR(S) : Lawrence Jacobs et al.

It is certified that error appears in the above-identified patent and that said Letters Patent is hereby corrected as shown below:

Title page,
Under OTHER PUBLICATIONS, replace
"Progrewss Software, 'Webspeed 1.0 technical product brief' 1998, wysiwyg://90/http://www/progresssoftwa...ernet/webspeed/white/tech/docs/arch.html."

with

-- Progress Software, "Webspeed 1.0 technical product brief," 1998, wysiwyg://90/http://www/progresssoftwa...ernet/webspeed/white/tech/docs/arch.html --.

Figure 7A:
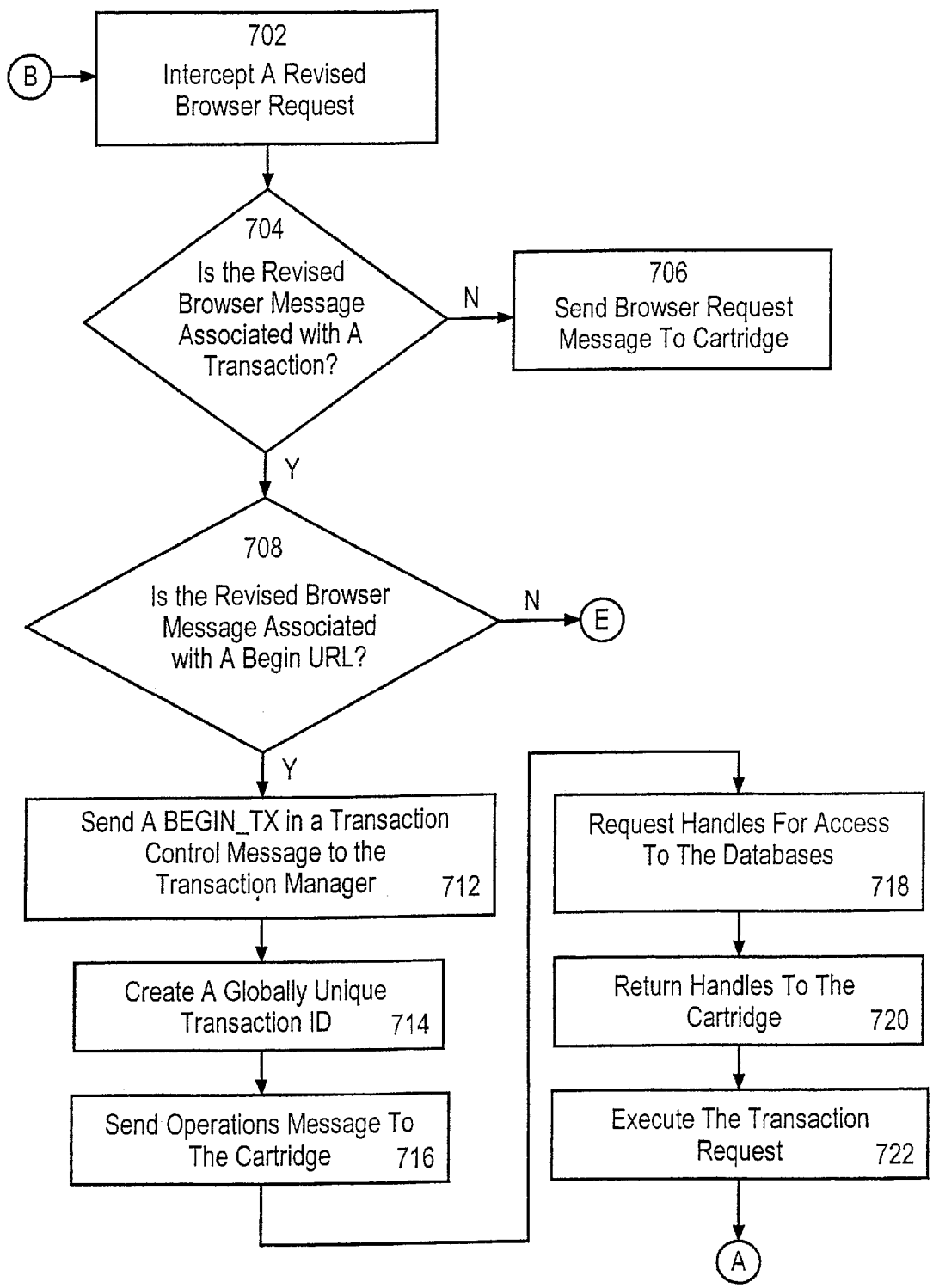
FIG. 7A is a portion of a flow diagram illustrating steps for processing multiple-request transactions in a stateless environment according to an embodiment of the invention.
Figure 7B:
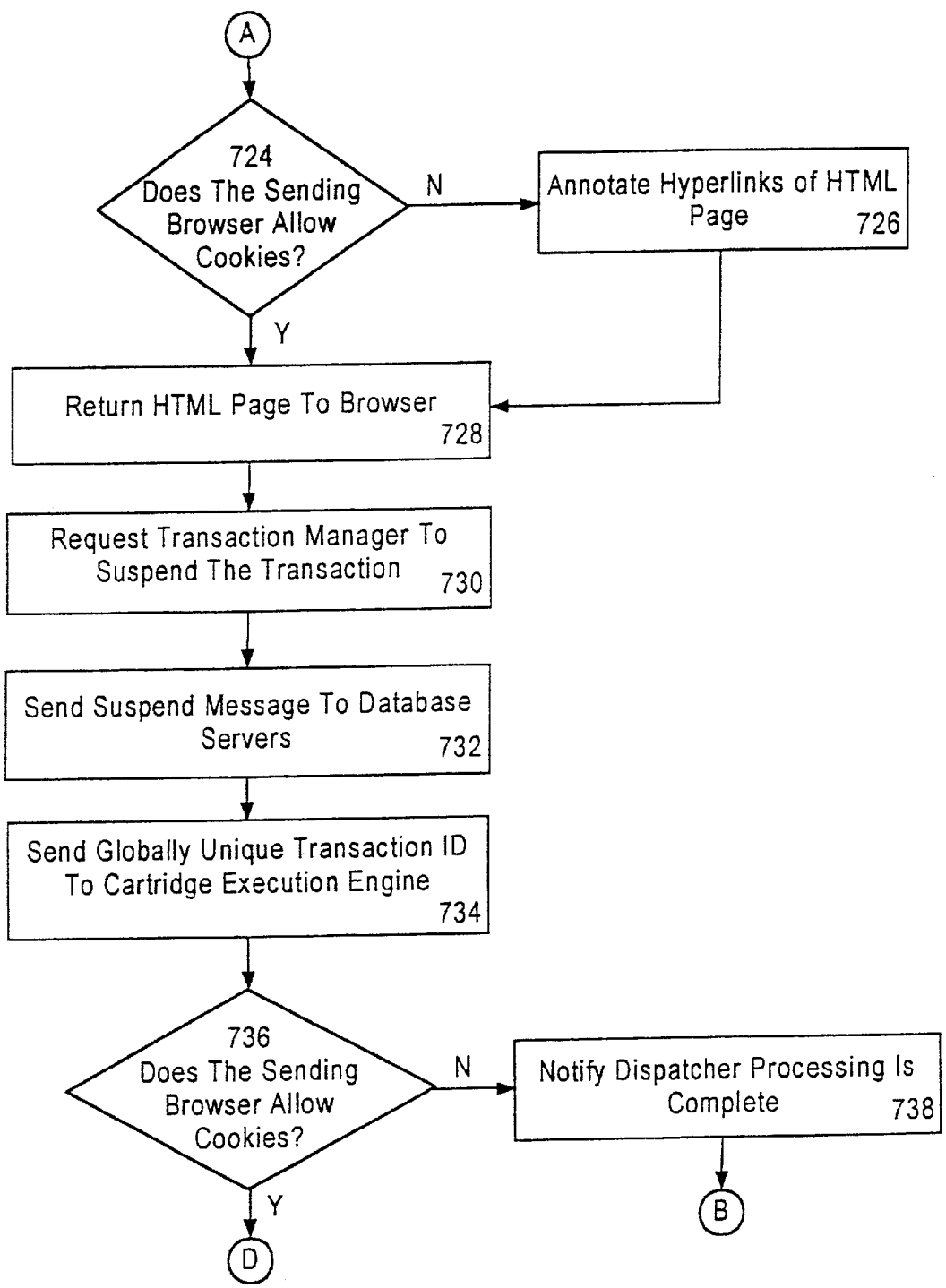
FIG. 7B is another portion of the flow diagram illustrating steps for processing multiple-request transactions in a stateless environment according to an embodiment of the invention.
Figure 7C:
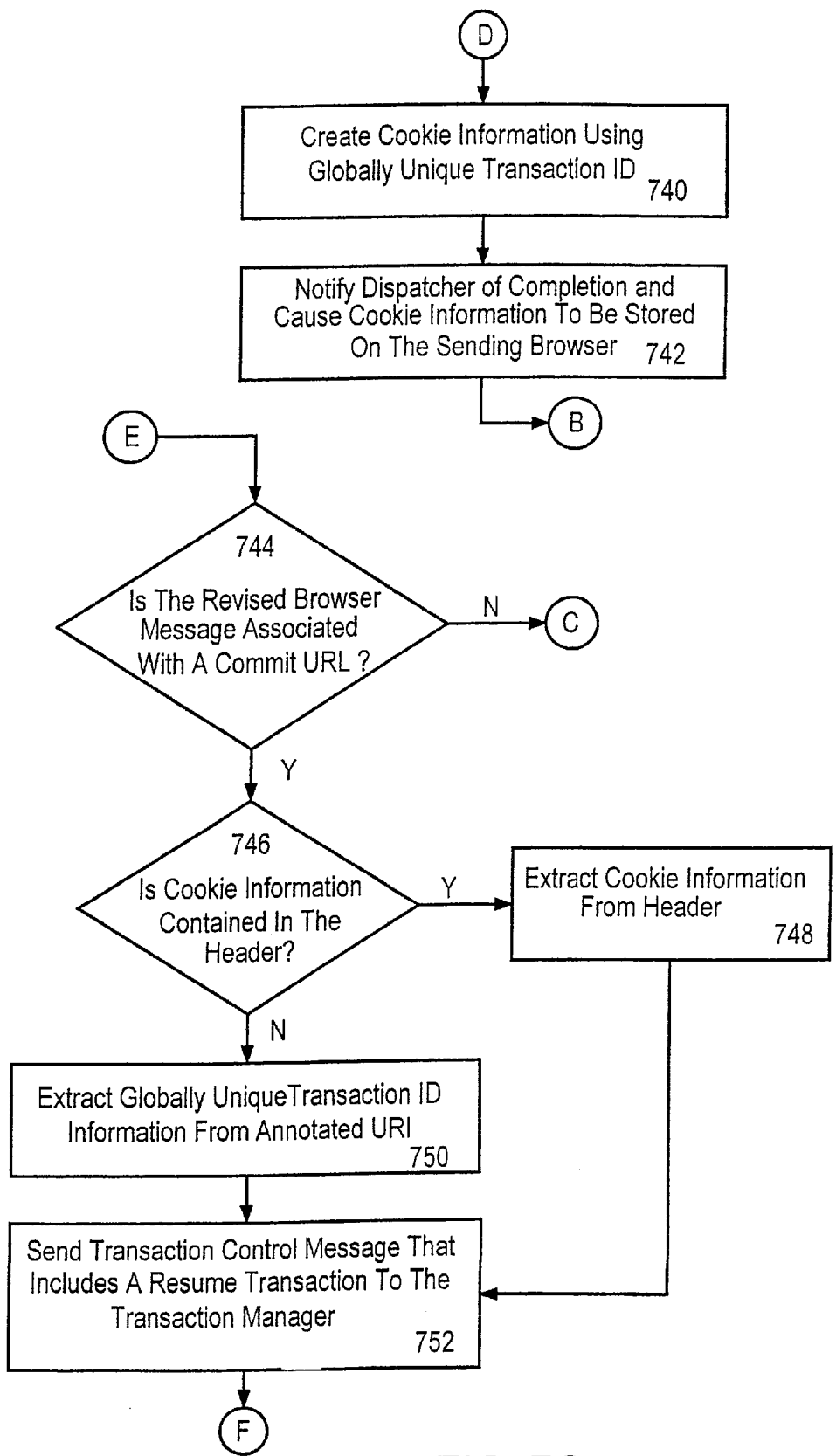
FIG. 7C is another portion of the flow diagram illustrating steps for processing multiple-request transactions in a stateless environment according to an embodiment of the invention.
Figure 7D:
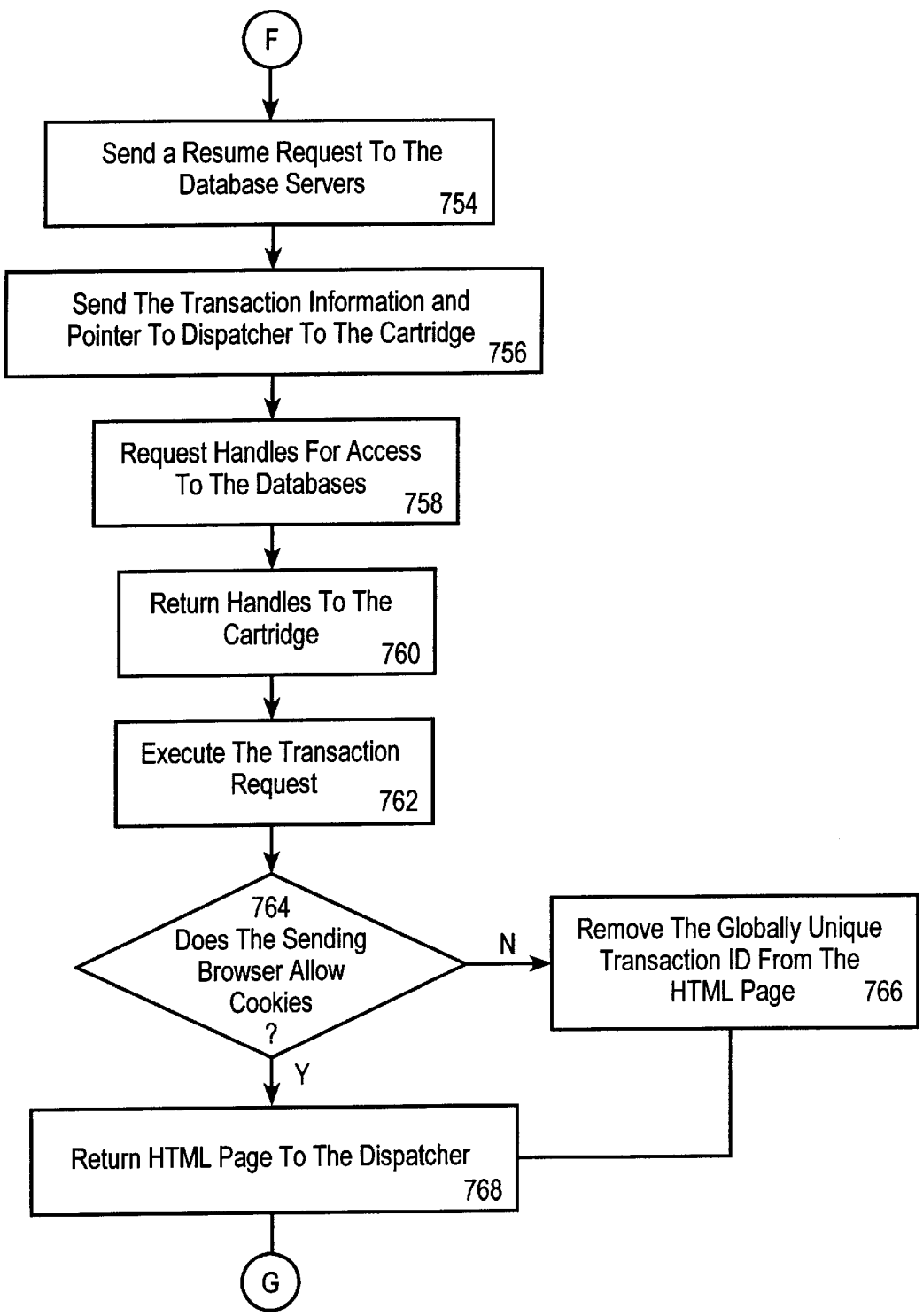
FIG. 7D is another portion of the flow diagram illustrating steps for processing multiple-request transactions in a stateless environment according to an embodiment of the invention.
Figure 7E:
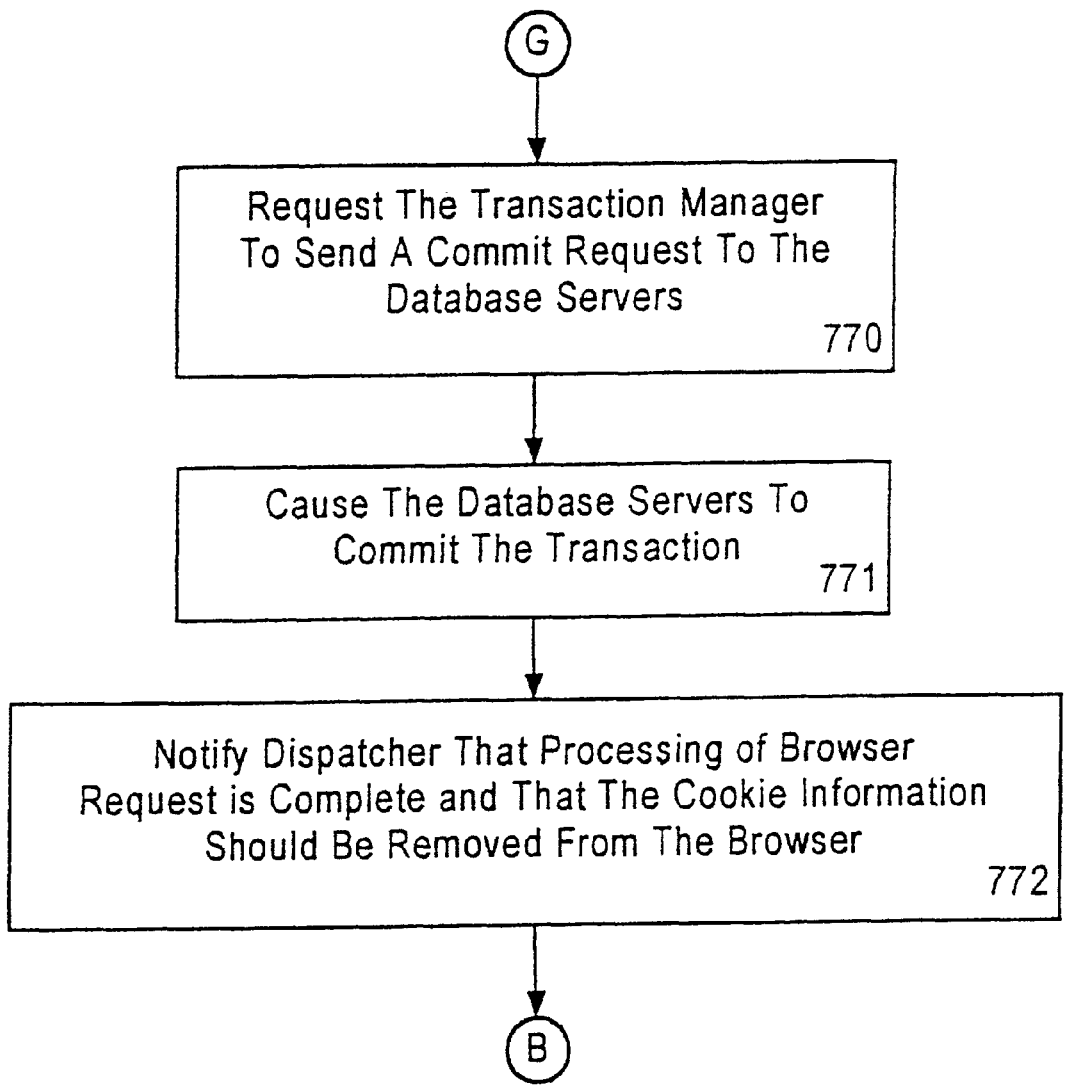
FIG. 7E is another portion of the flow diagram illustrating steps for processing multiple-request transactions in a stateless environment according to an embodiment of the invention.
Figure 7F:
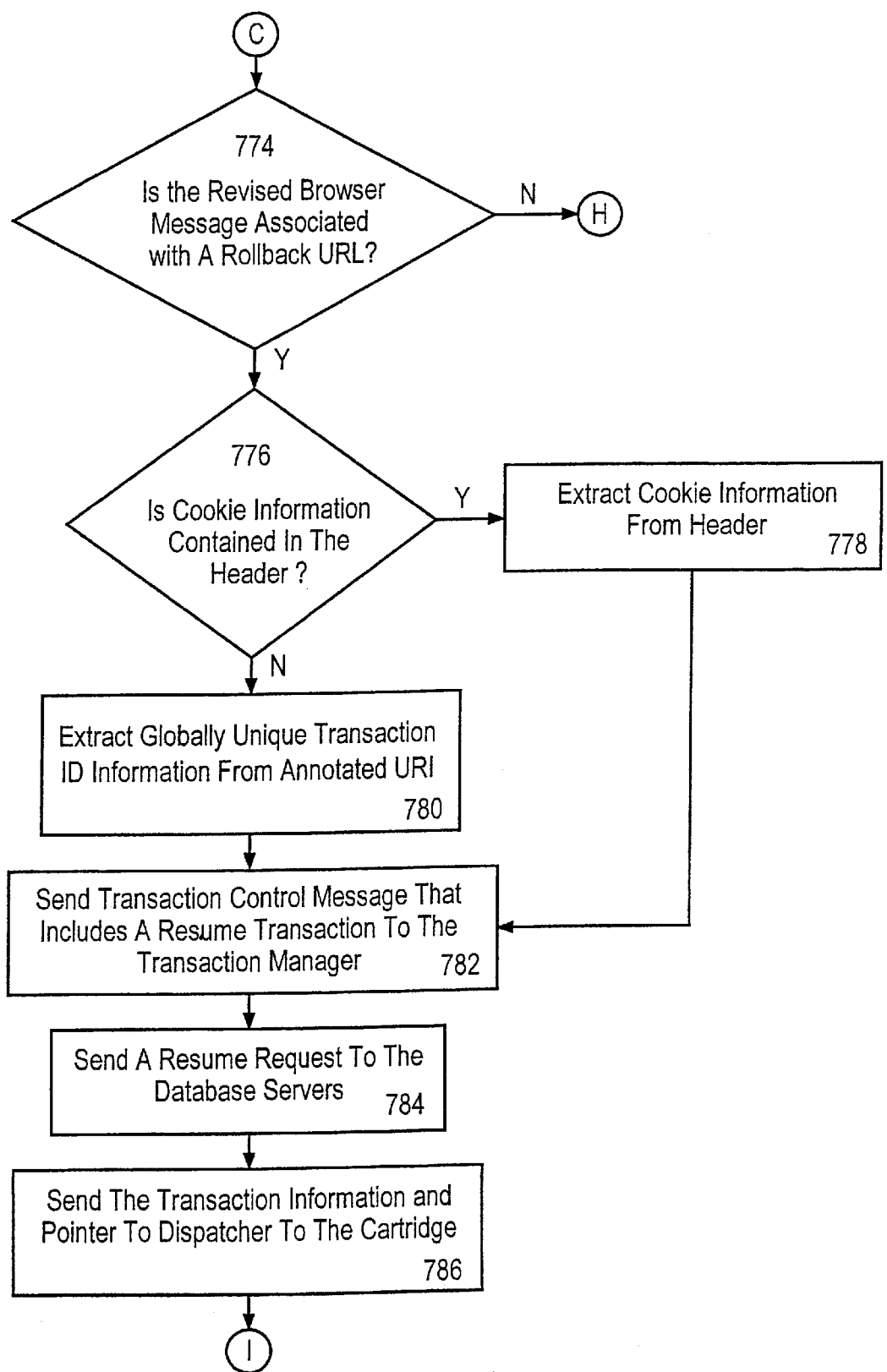
FIG. 7F is another portion of the flow diagram illustrating steps for processing multiple-request transactions in a stateless environment according to an embodiment of the invention.
Figure 7G:
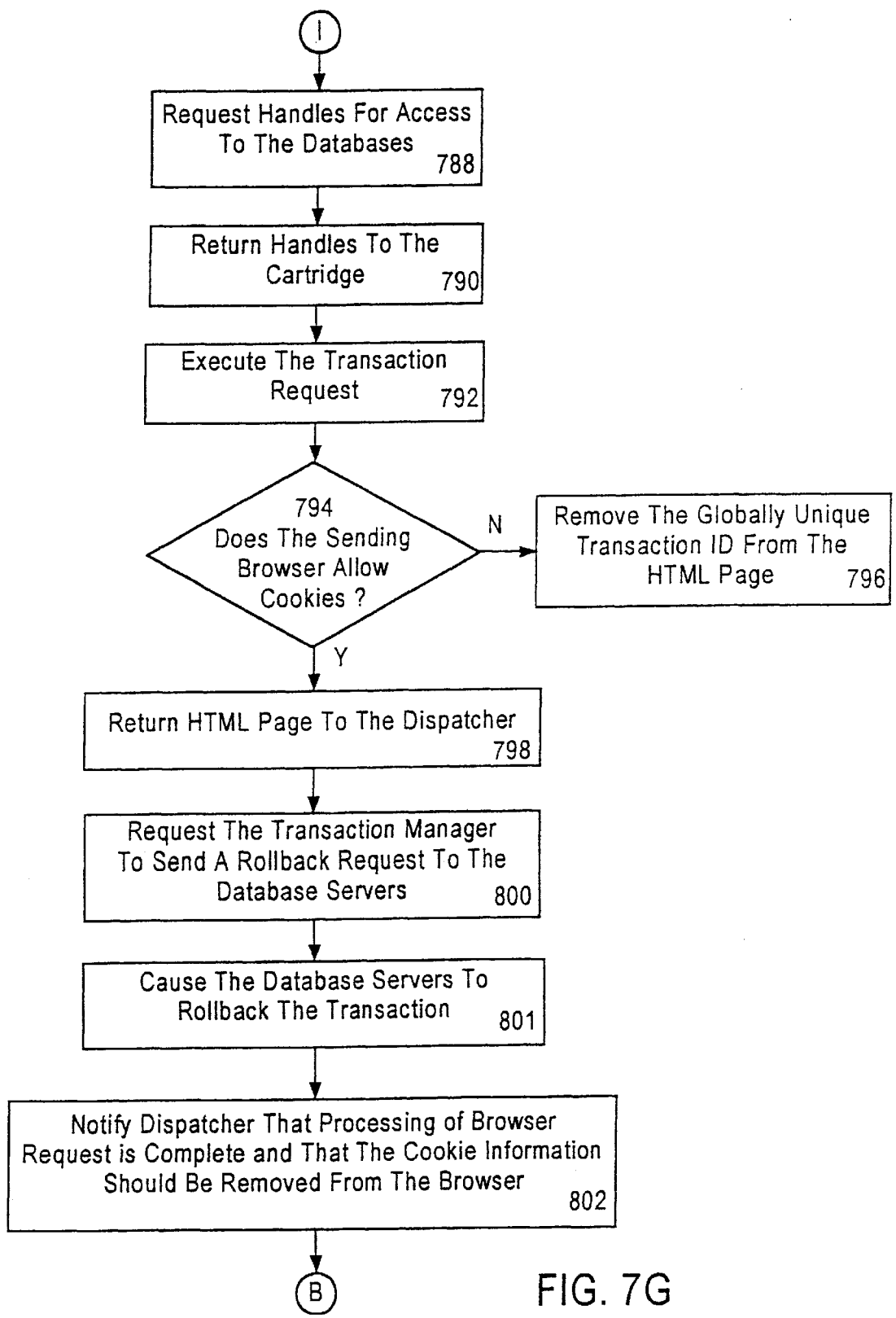
FIG. 7G is another portion of the flow diagram illustrating steps for processing multiple-request transactions in a stateless environment according to an embodiment of the invention.
Figure 7H:
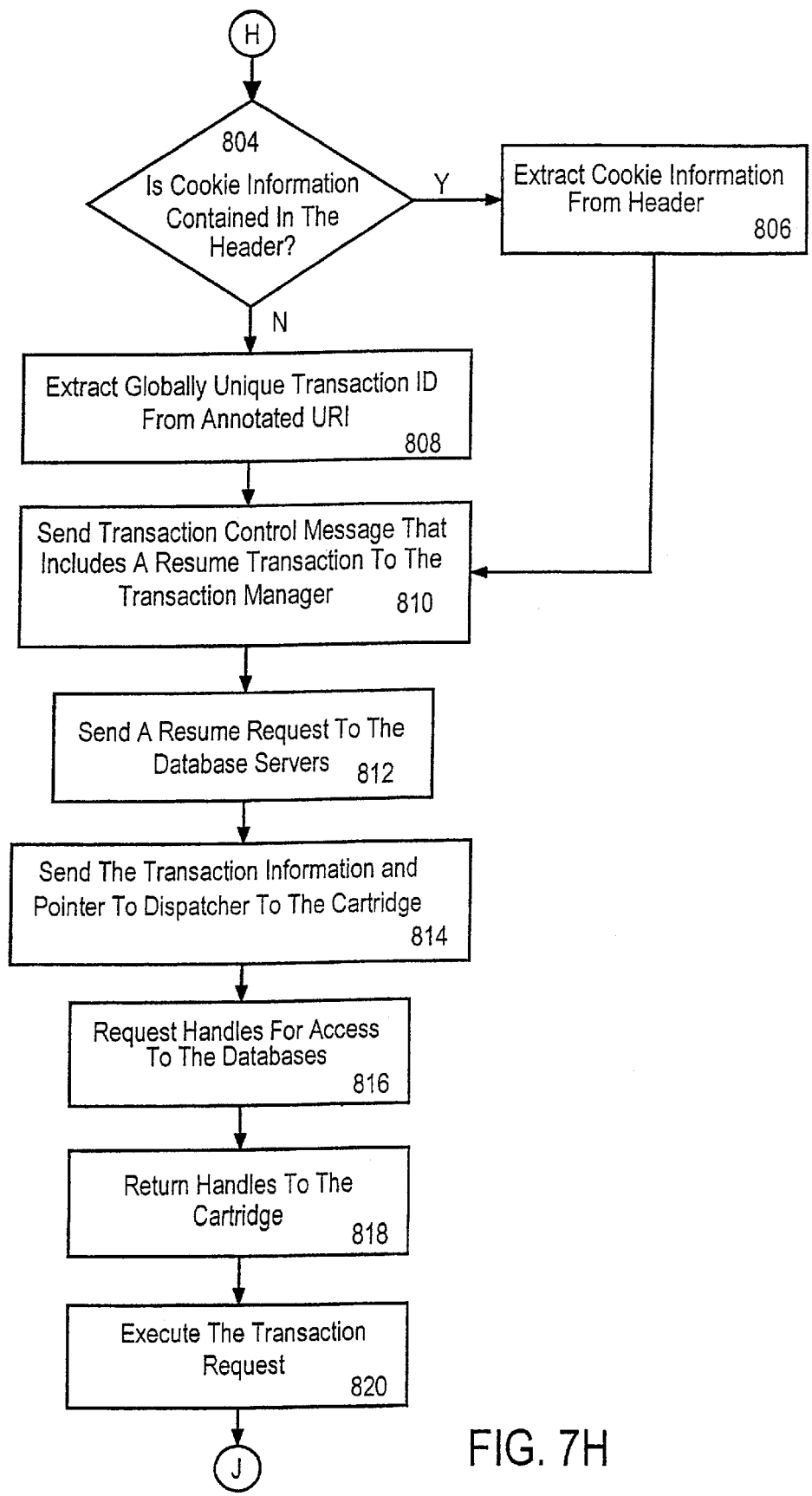
FIG. 7H is another portion of the flow diagram illustrating steps for processing multiple-request transactions in a stateless environment according to an embodiment of the invention.
Figure 7I:
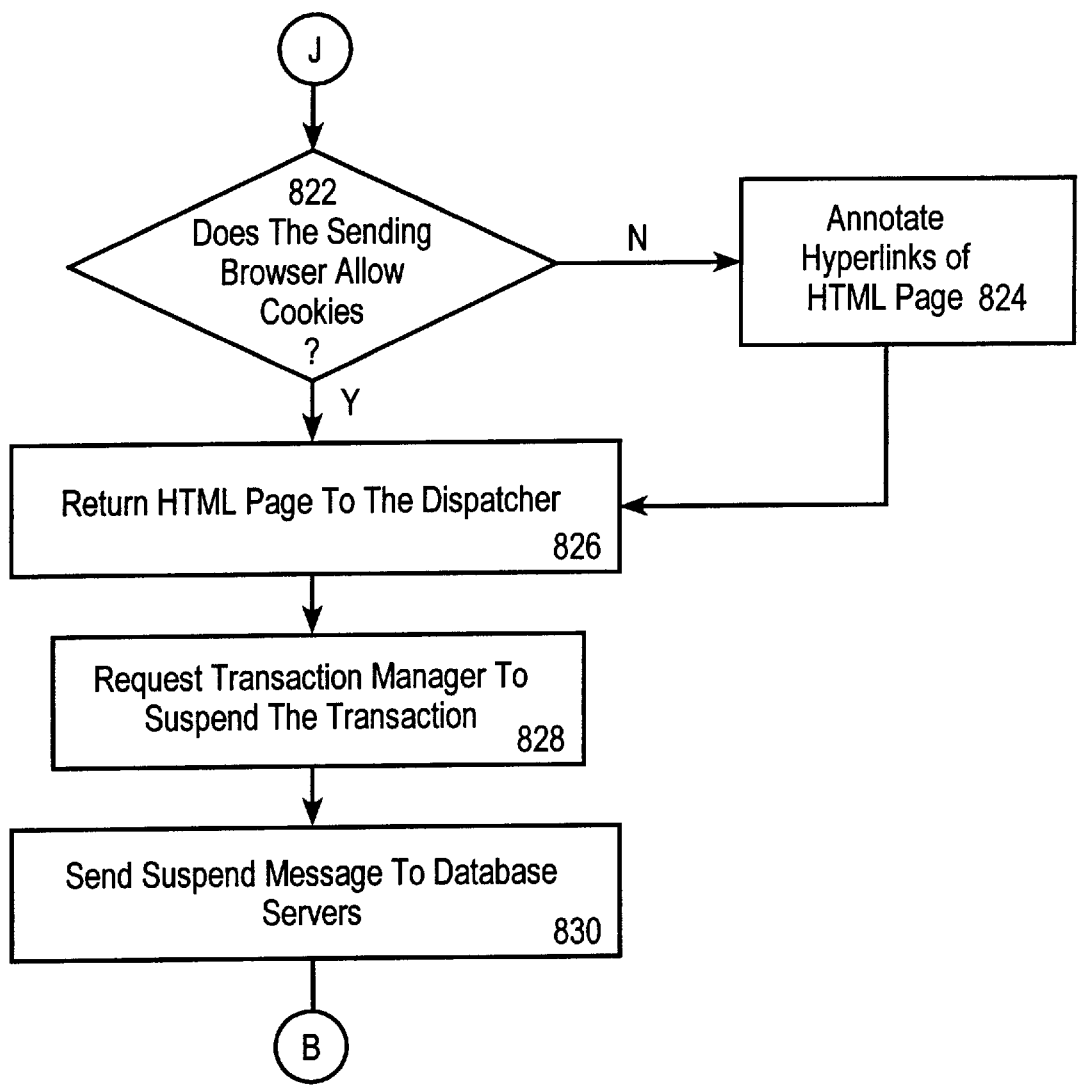
FIG. 7I is another portion of the flow diagram illustrating steps for processing multiple-request transactions in a stateless environment according to an embodiment of the invention.
Figure 7A:
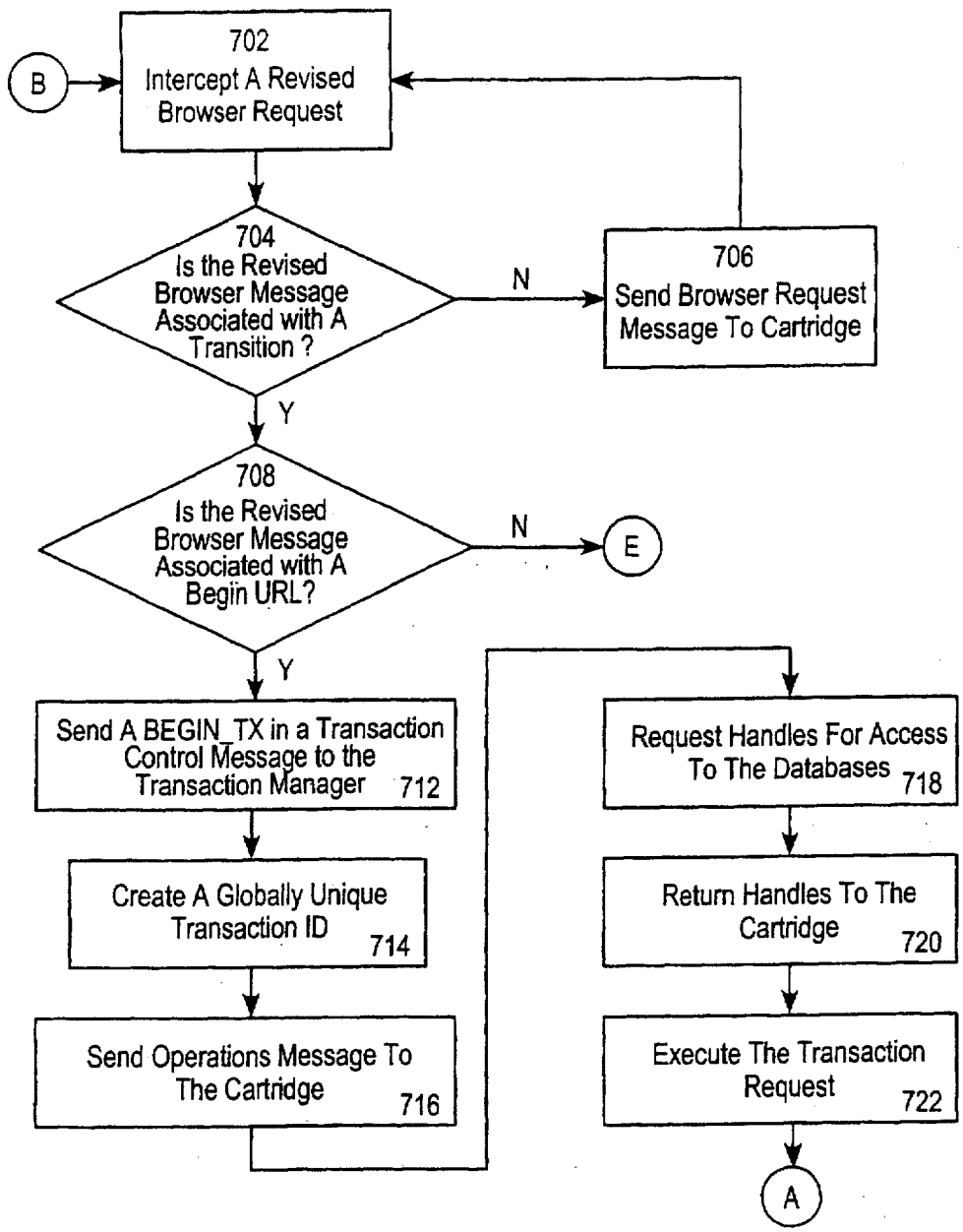

Drawings,
Replace printed FIG. 7A with the attached corrected FIG. 7A.

Signed and Sealed this

Sixteenth Day of April, 2002

Attest:

Attesting Officer

JAMES E. ROGAN
Director of the United States Patent and Trademark Office